US012302322B2

(12) United States Patent
Gao et al.

(10) Patent No.: US 12,302,322 B2
(45) Date of Patent: May 13, 2025

(54) SYSTEMS AND METHODS OF PUCCH RELIABILITY ENHANCEMENT

(71) Applicant: Telefonaktiebolaget LM Ericsson (publ), Stockholm (SE)

(72) Inventors: Shiwei Gao, Nepean (CA); Helka-Liina Määttänen, Helsinki (FI); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 277 days.

(21) Appl. No.: 17/795,577

(22) PCT Filed: Feb. 5, 2021

(86) PCT No.: PCT/IB2021/050968
§ 371 (c)(1),
(2) Date: Jul. 27, 2022

(87) PCT Pub. No.: WO2021/156826
PCT Pub. Date: Aug. 12, 2021

(65) Prior Publication Data
US 2023/0077264 A1 Mar. 9, 2023

Related U.S. Application Data

(60) Provisional application No. 62/970,572, filed on Feb. 5, 2020.

(51) Int. Cl.
*H04W 72/20* (2023.01)
*H04W 72/23* (2023.01)

(52) U.S. Cl.
CPC ........... *H04W 72/20* (2023.01); *H04W 72/23* (2023.01)

(58) Field of Classification Search
CPC .............................. H04W 72/23; H04W 72/20
See application file for complete search history.

(56) References Cited

U.S. PATENT DOCUMENTS

| 2019/0281588 | A1* | 9/2019 | Zhang | H04B 7/0617 |
| 2019/0379506 | A1 | 12/2019 | Cheng | |
| 2024/0235775 | A1* | 7/2024 | Wang | H04L 5/0094 |

OTHER PUBLICATIONS

Author Unknown, "Technical Specification Group Radio Access Network; NR; Multiplexing and channel coding (Release 16)," Technical Specification 38.212, Version 16.0.0, Dec. 2019, 3GPP Organizational Partners, 145 pages.

(Continued)

*Primary Examiner* — Dang T Ton
(74) *Attorney, Agent, or Firm* — Withrow & Terranova, PLLC

(57) ABSTRACT

Systems and methods of PUCCH reliability are provided. In some embodiments, a method performed by a wireless device includes: receiving an activation command to activate a first and a second spatial relation; optionally determining the first and the second spatial relation based on one or more Downlink TCI states; transmitting the UCI according to the first spatial relation in a first set of symbols or slots; and transmitting the UCI according to the second spatial relation in a second set of symbols or slots. In this way, fewer changes to the specifications are required. The existing RRC configuration for spatial relations and MAC CE activation might be used. Spatial relations might be selected by the MAC CE. Also, the existing DCI can be used where a PUCCH resource is selected by PRI bits. Since MAC CE is used to select spatial relations, different combinations can be selected dynamically.

36 Claims, 21 Drawing Sheets

(56) References Cited

OTHER PUBLICATIONS

Author Unknown, "Technical Specification Group Radio Access Network; NR; Physical layer procedures for control (Release 16)," Technical Specification 38.213, Version 16.0.0, Dec. 2019, 3GPP Organizational Partners, 146 pages.

Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.

Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 532 pages.

Caict, "R1-1902926: Discussion on URLLC reliability/robustness enhancement with multi-TRP/panel," 3GPP TSG RAN WG1 #96, Feb. 25-Mar. 1, 2019, Athens, Greece, 3 pages.

NTT DOCOMO, INC., "R1-1906225: Discussion on multi-beam enhancement," 3GPP TSG RAN WG1 #97, May 13-17, 2019, Reno, Nevada, 24 pages.

NTT DOCOMOo, "R1-1911184: Enhancements on multi-TRP/panel transmission," 3GPP TSG RAN WG1 #98bis, Oct. 14-20, 2019, Chongqing, China, 32 pages.

International Search Report and Written Opinion for International Patent Application No. PCT/IB2021/050968, mailed May 12, 2021, 15 pages.

NTT DOCOMO, INC., "R1-1902812: Enhancements on multi-TRP/panel transmission," 3GPP TSG RAN WG1 #96, Feb. 25-Mar. 1, 2019, Athens, Greece, 25 pages.

Notice of Reasons for Refusal for Japanese Patent Application No. 2022-546604, mailed Aug. 29, 2023, 18 pages.

LG Electronics, "R1-1910582: Enhancements on multi-TRP/panel transmission," 3GPP TSG RAN WG1 Meeting #98bis, Oct. 14-20, 2019, Chongqing, China, 23 pages.

Qualcomm Incorporated, "R1-1708620: Long PUCCH design considerations," 3GPP TSG-RAB WG1 #89, May 15-19, 2017, Hangzhou, China, 3 pages.

Examination Report for European Patent Application No. 21704946.9, mailed Mar. 10, 2025, 8 pages.

Notice of Reasons for Refusal for Japanese Patent Application No. 2024-029558, mailed Feb. 4, 2025, 11 pages.

\* cited by examiner

A. INTER-SLOT FH ENABLED

B. INTER-SLOT FH DISABLED, AND INTRA-SLOT FH ENABLED

A.

B.

AN EXAMPLE OF PUCCH TRANSMISSION TOWARDS MULTIPLE TRPS FOR INCREASING RELIABILITY.

SYSTEMS AND METHODS OF PUCCH RELIABILITY ENHANCEMENT

RELATED APPLICATIONS

This application is a 35 U.S.C. § 371 national phase filing of International Application No. PCT/IB2021/050968, filed Feb. 5, 2021, which claims the benefit of provisional patent application Ser. No. 62/970,572, filed Feb. 5, 2020, the disclosures of which are hereby incorporated herein by reference in their entireties.

TECHNICAL FIELD

The present disclosure relates to Physical Uplink Control Channel (PUCCH) reliability.

BACKGROUND

The next generation mobile wireless communication system (5G) or New Radio (NR), will support a diverse set of use cases and a diverse set of deployment scenarios. The later includes deployment at both low frequencies (below 6 GHz) and very high frequencies (up to 10's of GHz).
NR Frame Structure and Resource Grid NR uses Cyclic Prefix Orthogonal Frequency Division Multiplexing (CP-OFDM) in both Downlink (DL) (i.e., from a network node, gNB, or base station, to a User Equipment (UE) and Uplink (UL) (i.e., from UE to gNB). Discrete Fourier Transform (DFT) spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically in slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH). Different subcarrier spacing values are supported in NR. The supported subcarrier spacing values (also referred to as different numerologies) are given by $\Delta f=(15 \times 2^\mu)$ kHz where $\in \{0,1,2,3,4\}$. $\Delta f=15$ kHz is the basic subcarrier spacing. The slot durations at different subcarrier spacings is given by $$\frac{1}{2^\mu} \text{ ms.}$$

In the frequency domain, a system bandwidth is divided into resource blocks (RBs), each corresponding to 12 contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one resource element (RE).

Downlink transmissions are dynamically scheduled, i.e., in each slot the gNB transmits downlink control information (DCI) over PDCCH about which UE data is to be transmitted to and which RBs in the current downlink slot the data is transmitted on. The UE data are carried on PDSCH.

There are three DCI formats defined for scheduling PDSCH in NR, i.e., DCI format 1_0 and DCI format 1_1 which were introduced in NR Rel-15, and DCI format 1_2 which was introduced in NR Rel-16. DCI format 1_0 has a smaller size than DCI 1_1 and can be used when a UE is not fully connected to the network while DCI format 1_1 can be used for scheduling Multiple-Input-Multiple-Output (MIMO) transmissions with multiple MIMO layers.

In NR Rel-16, DCI format 1_2 was introduced for downlink scheduling. One of the main motivations for having the new DCI format is to be able to configure a very small DCI size which can provide some reliability improvement without losing much flexibility. The main design target of the new DCI format is thus to have DCI with configurable sizes for some fields with a minimum DCI size targeting a reduction of 10-16 bits relative to Rel-15 DCI format 1_0.
NR HARQ ACK/NACK Feedback Over PUCCH When receiving a PDSCH in the downlink from a serving gNB at slot n, a UE feeds back a HARQ ACK at slot n+k over a PUCCH (Physical Uplink Control Channel) resource in the uplink to the gNB if the PDSCH is decoded successfully, otherwise, the UE sends a HARQ NACK at slot n+k to the gNB to indicate that the PDSCH is not decoded successfully. If two Transport Blocks (TBs) are carried by the PDSCH, then a HARQ ACK/NACK is reported for each TB.

For DCI format 1_0, k is indicated by a 3-bit PDSCH-to-HARQ-timing-indicator field. For DCI formats 1_1 and 1_2, k is indicated either by a 0-3 bit PDSCH-to-HARQ-timing-indicator field, if present, or by higher layer configuration through Radio Resource Control (RRC) signaling. Separate RRC configuration of PDSCH to HARQ-Ack timing are used for DCI formats 1_1 and 1_2.

For DCI format 1_1, if CBG transmission is configured, a HARQ ACK/NACK for each CBG in a TB is reported instead.

In case of Carrier Aggregation (CA) with multiple carriers and/or TDD operation, multiple aggregated HARQ ACK/NACK bits need to be sent in a single PUCCH.
PUCCH Resources In NR, up to four PUCCH resource sets can be configured to a UE. A PUCCH resource set with pucch-ResourceSetId=0 can have up to 32 PUCCH resources while for PUCCH resource sets with pucch-ResourceSetId=1 to 3, each set can have up to 8 PUCCH resources. A UE determines the PUCCH resource set in a slot based on the number of aggregated Uplink Control Information (UCI) bits to be sent in the slot. The UCI bits consist of HARQ ACK/NACK, Scheduling Request (SR), and Channel State Information (CSI) bits.

For a PUCCH transmission with HARQ-ACK information, a UE determines a PUCCH resource after determining a PUCCH resource set. The PUCCH resource determination is based on a 3-bit PUCCH Resource Indicator (PRI) field in DCI format 1_0 or DCI format 1_1. In the case of DCI format 1_2, the PUCCH resource determination is based on a configurable PRI field with the field size configurable between 0 and 3 bits.

If more than one DCI format 1_0, 1_1 or 1_2 are received in the case of CA and/or TDD, the PUCCH resource determination is based on a PRI field in the last DCI format 1_0, 1_1 or 1_2 among the multiple received DCI format 1_0, 1_1 or 1_2 that the UE detects. In this case, the multiple received DCI format 1_0, 1_1 or 1_2 have a value of a PDSCH-to-HARQ feedback timing indicator field indicating a same slot for the PUCCH transmission. For PUCCH resource determination in this case, detected DCI formats are first indexed in an ascending order across serving cells indexed for a same PDCCH monitoring occasion and are then indexed in an ascending order across PDCCH monitoring occasion indexes.

PUCCH Formats

Five PUCCH formats are defined in NR, i.e., PUCCH formats 0 to 4. UE transmits UCI in a PUCCH using PUCCH format 0 if
  the transmission is over 1 symbol or 2 symbols,
  the number of HARQ-ACK information bits with positive or negative SR (HARQ-ACK/SR bits) is 1 or 2
UE transmits UCI in a PUCCH using PUCCH format 1 if
  the transmission is over 4 or more symbols,
  the number of HARQ-ACK/SR bits is 1 or 2
UE transmits UCI in a PUCCH using PUCCH format 2 if
  the transmission is over 1 symbol or 2 symbols,
  the number of UCI bits is more than 2
UE transmits UCI in a PUCCH using PUCCH format 3 if
  the transmission is over 4 or more symbols,
  the number of UCI bits is more than 2,
  the PUCCH resource does not include an orthogonal cover code
UE transmits UCI in a PUCCH using PUCCH format 4 if
  the transmission is over 4 or more symbols,
  the number of UCI bits is more than 2,
  the PUCCH resource includes an orthogonal cover code
PUCCH formats 0 and 2 use one or two OFDM symbols while PUCCH formats 1, 3, and 4 can span from 4 to 14 symbols. Thus, PUCCH format 0 and 2 are referred to as short PUCCH while PUCCH formats 1, 3, and 4 as long PUCCH.

Short PUCCH Formats

A PUCCH format 0 resource can be one or two OFDM symbols within a slot in time domain and one RB in frequency domain. FIG. 3 illustrates an example of one and two symbol short PUCCH without Frequency Hopping (FH). UCI is used to select a cyclic shift of a computer-generated length 12 base sequence which is mapped to the RB. The starting symbol and the starting RB are configured by RRC. In case of two symbols are configured, the UCI bits are repeated in two consecutive symbols.

A PUCCH Format 2 resource can be one or two OFDM symbols within a slot in time domain and one or more RB in frequency domain. UCI in PUCCH Format 2 is encoded with Reed-Muller (RM) codes (≤11 bit UCI+CRC) or Polar codes (>11 bit UCI+CRC) and scrambled. In case of two symbols are configured, UCI is encoded and mapped across two consecutive symbols.

Intra-slot FH may be enabled in case of two symbols are configured for PUCCH formats 0 and 2. If FH is enabled, the starting PRB in the second symbol is configured by RRC. Cyclic shift hopping is used when two symbols are configured such that different cyclic shifts are used in the two symbols.

Long PUCCH Formats

A PUCCH Format 1 resource is 4-14 symbols long and 1 PRB wide per hop. A computer-generated length 12 base sequence is modulated with UCI and weighted with time-domain OCC code. Frequency-hopping with one hop within the active UL BWP for the UE is supported and can be enabled/disabled by RRC. Base sequence hopping across hops is enabled in case of FH and across slots in case of no FH.

A PUCCH Format 3 resource is 4-14 symbols long and one or multiple PRB wide per hop. UCI in PUCCH Format 3 is encoded with RM (Reed-Muller) codes (≤11 bit UCI+CRC) or Polar codes (>11 bit UCI+CRC) and scrambled.

FIG. 4 illustrates an example 14-symbol and 7-symbol long PUCCH with intra-slot FH enabled.

A PUCCH Format 4 resource is 4-14 symbols long and 1 PRB wide per hop. It has a similar structure as PUCCH format 3 but can be used for multi-UE multiplexing. FIG. 5 illustrates an example 14-symbol and 7-symbol long PUCCH with intra-slot FH disabled.

For PUCCH formats 1, 3, or 4, a UE can be configured a number of slots, $N_{PUCCH}^{repeat}$, for repetitions of a PUCCH transmission by respective nrofSlots. For $N_{PUCCH}^{repeat}>1$,
  the UE repeats the PUCCH transmission with the UCI over $N_{PUCCI}^{repeat}$ slots
    a PUCCH transmission in each of the $N_{PUCCI}^{repeat}$ slots has a same number of consecutive symbols,
    a PUCCH transmission in each of the $N_{PUCCI}^{repeat}$ slots has a same first symbol,
  if the UE is configured to perform frequency hopping for PUCCH transmissions across different slots
    the UE performs frequency hopping per slot
    the UE transmits the PUCCH starting from a first PRB in slots with even number and starting from the second PRB in slots with odd number. The slot indicated to the UE for the first PUCCH transmission has number 0 and each subsequent slot until the UE transmits the PUCCH in $N_{PUCCI}^{repeat}$ slots is counted regardless of whether or not the UE transmits the PUCCH in the slot
    the UE does not expect to be configured to perform frequency hopping for a PUCCH transmission within a slot
  If the UE is not configured to perform frequency hopping for PUCCH transmissions across different slots and if the UE is configured to perform frequency hopping for PUCCH transmissions within a slot, the frequency hopping pattern between the first PRB and the second PRB is same within each slot. FIG. 6 illustrates an example of PUCCH repetition in two slots with (a) inter-slot FH enabled and (b) inter-slot FH disabled while intra-slot FH enabled.

Spatial Relation Definition

Spatial relation is used in NR to refer to a relationship between an UL reference signal (RS) such as PUCCH/PUSCH DMRS (demodulation reference signal) and another RS, which can be either a DL RS (CSI-RS (channel state information RS) or SSB (synchronization signal block)) or an UL RS (SRS (sounding reference signal)). This is also defined from a UE perspective.

If an UL RS is spatially related to a DL RS, it means that the UE should transmit the UL RS in the opposite (reciprocal) direction from which it received the DL RS previously. More precisely, the UE should apply the "same" Tx spatial filtering configuration for the transmission of the UL RS as the Rx spatial filtering configuration it used to receive the spatially related DL RS previously. Here, the terminology 'spatial filtering configuration' may refer to the antenna weights that are applied at either the transmitter or the receiver for data/control transmission/reception. The DL RS is also referred as the spatial filter reference signal.

On the other hand, if a first UL RS is spatially related to a second UL RS, then the UE should apply the same Tx spatial filtering configuration for the transmission for the first UL RS as the Tx spatial filtering configuration it used to transmit the second UL RS previously.

An example of using spatial relation for PUCCH is shown in FIG. 7. First, the gNB in Transmission and Reception Point (TRP) A indicates to the UE that the PUCCH DMRS is spatially related to the DL RS. Then, the UE receives the DL RS using RX spatial filtering configuration (i.e., Rx beam) shown in FIG. 7A. As shown in FIG. 7B, the UE uses the same TX spatial filtering configuration (i.e., Tx beam) as the one it used in FIG. 7A to transmit PUCCH.

Spatial Relation Indication for PUCCH
NR Rel-15 Spatial Relation Indication for PUCCH For NR Rel-15, 3GPP TS 38.213 and 3GPP TS 38.331 specify that a UE can be RRC configured with a list of up to 8 spatial relations for PUCCH. This list is given by the RRC parameter PUCCH_SpatialRelationInfo. For example, the list would typically contain the IDs of a number of SSBs and/or CSI-RS resources. Alternatively, the list may also contain the IDs of a number of SRS resources.

Based on the DL(UL) beam management measurements performed by the UE(gNB), the gNB selects one of the RS IDs from the list of configured ones in PUCCH_SpatialRelationInfo. The selected spatial relation is then activated via a MAC-CE message signaled to the UE for a given PUCCH resource. The UE then uses the signaled spatial relation for the purposes of adjusting the Tx spatial filtering configuration for the transmission on that PUCCH resource.

The MAC CE for activation/deactivation for PUCCH spatial relation is shown in FIG. 8. The MAC-CE message contains (1) the ID of the PUCCH resource, and (2) an indicator of which of the 8 configured spatial relations in PUCCH_SpatialRelationInfo is selected (given by the 8 bits $S_0, S_1, S_2, \ldots, S_7$). The MAC CE also includes the Serving Cell ID for which the MAC CE applies, and the BWP ID (bandwidth part ID) which indicates the UL BWP for which the MAC CE applies as the codepoint of the DCI bandwidth part indicator field as specified in 3GPP TS 38.212.

In addition to proving the spatial relation for PUCCH, each PUCCH_SpatialRelationInfo (as shown below) also provides some PUCCH power control parameters including a Reference RS ID (i.e., pucch-PathlossReferenceRS-Id) for path loss estimation, p0-PUCCH-Id for open loop power control, and closedLoopIndex for closed loop power control. The pucch-PathlossReferenceRS can be either a CSI-RS or SSB.

simultaneously update/indicate a single spatial relation per group of PUCCH resources. When the MAC CE simultaneously updates/indicates a single spatial relation for a group of PUCCH resources, the indicated spatial relation is applied to all the PUCCH resources in the group of PUCCH resources. In NR Rel-16, up to 4 PUCCH groups are supported per BWP.

HARQ A/N Enhancement for URLLC in NR Rel-16

In NR Rel 16, a higher priority may be assigned to PDSCHs carrying URLLC (Ultra-reliable Low latency) traffic and indicated in DCIs scheduling the PDSCHs. HARQ Ack/Nack information for PDSCHs with higher priority is transmitted separately from HARQ A/N information for other PDSCHs. This allows HARQ A/N for URLLC traffic to be transmitted early in different PUCCH resources and more reliably.

Furthermore, in NR Rel-16, it has been agreed that at least one sub-slot configuration for PUCCH can be UE-specifically configured and that multiple HARQ Ack/Nack transmissions per slot are possible. The sub-slot configuration supports periodicities of two symbols (i.e., seven 2-symbol PUCCH occasions per slot) and seven symbols (i.e., two 7-symbol PUCCH occasions per slot). One of the reasons for introducing these sub-slot configurations in NR Rel-16 is to enable the possibility for multiple opportunities of HARQ Ack/Nack transmissions within a slot without needing to configure several PUCCH resources. For example, in Rel-16, a UE running URLLC service may be configured with a possibility of receiving PDCCH in every second OFDM symbol e.g., symbol 0, 2, 4, . . . , 12 and be configured with a PUCCH resource with sub-slot configuration seven 2-symbol sub-slots within a slot for HARQ-ACK transmission also in every second symbol, e.g., 1, 3, . . . , 13. For a Rel-16 UE configured with sub-slots for PUCCH transmission, the PDSCH-to-HARQ feedback timing indicator field in DCI indicates the timing offset in terms of sub-slots instead of slots.

Ultra-Reliable Low Latency Communication (URLLC) Data Transmission Over Multiple Transmission and Reception Points (TRPs)

Reliable PDSCH transmission with multiple panels or transmission points has been introduced in 3GPP for NR Rel-16, in which a transport block may be transmitted over

```
PUCCH-SpatialRelationInfo ::=        SEQUENCE {
    pucch-SpatialRelationInfoId          PUCCH-SpatialRelationInfoId,
    servingCellId                        ServCellIndex                OPTIONAL,
-- Need S
    referenceSignal                      CHOICE {
        ssb-Index                            SSB-Index,
        csi-RS-Index                         NZP-CSI-RS-ResourceId,
        srs                                  SEQUENCE {
                                                 resource        SRS-ResourceId,
                                                 uplinkBWP       BWP-Id
                                             }
    },
    pucch-PathlossReferenceRS-Id         PUCCH-PathlossReferenceRS-Id,
    p0-PUCCH-Id                          P0-PUCCH-Id,
    closedLoopIndex                      ENUMERATED { i0, i1 }
}
NR Rel-16 Spatial relation indication for PUCCH
```

One enhancement made in NR Rel-16 is to increase the maximum number of RRC configured spatial relations for PUCCH. As per this enhancement, an NR Rel-16 UE can be RRC configured with a list of up to 64 spatial relations for PUCCH.

For NR Rel-15, the spatial relation is updated per PUCCH resource. In NR Rel-16, to achieve signaling overhead reduction, simultaneous spatial relation update/indication for a group of PUCCH resources is introduced. In Rel-16, explicit higher layer signaling is used to indicate to the UE a group of PUCCH resources, and MAC CE is used to multiple TRPs to achieve diversity. Reliability is achieved by transmitting different layers of an encoded Codeword (CW) for the TB on the same resource over two TRPs (also known as Scheme 1a during Rel-16 standardization), or different part of a CW on different frequency resources over two TRPs (also known as Scheme 2a during Rel-16 standardization), or by repeating the same TB over two TRPs in time (also known as Schemes 3 and 4 during Rel-16 standardization) or frequency domain (also known as Scheme 2b during Rel-16 standardization). For this purpose, two TCI states are indicated in a DCI scheduling the PDSCH.

In NR Rel-17, it has been proposed to introduce further PUCCH enhancement with multiple TRPs by repeating a PUCCH towards to different TRPs as shown in FIG. 9.

Three methods were proposed in R1-1911184, "Enhancements on multi-TRP/panel transmission", NTT DOCOMO, 3GPP RAN1 #98bis, Chongqing, China, Oct. 14-20, 2019 (referred to herein as [1]):

Alt 1: spatial relation info for PUCCH for HARQ-ACK transmission to multiple TRPs is configured by RRC.

spatial relation info for PUCCH transmission for each TRP (for each repetition) is configured by RRC signaling. Regardless of which PUCCH resource is determined by the ARI indicated in the DCI and/or CCE index of the PDCCH, the configured sequence of spatialrelationInfo is applied across repetitions. An example is shown in Table 1.

TABLE 1

Example of PUCCH resource indication with semi-statically configured Spatialrelationinfo sequence suggested in [1]

| ARI field value | PUCCH resource | Spatialrelationinfo sequence |
| --- | --- | --- |
| 000 | Resource #a | Spatialrelationinfo ID#1 for 1st; |
| 001 | Resource #b | Spatialrelationinfo ID#2 for 2nd; |
| 010 | Resource #c | Spatialrelationinfo ID#3 for 3rd; |
| ... | | Spatialrelationinfo ID#4 for 4th |

Alt 2: spatial relation info for PUCCH for HARQ-ACK transmission to multiple TRPs is configured by RRC and MAC CE.

A set of spatialrelationinfo sequences can be configured by RRC, and then MAC CE activates one spatialrelationinfo sequence from multiple spatialrelationinfo sequences configured by RRC as shown in Table 2.

TABLE 2

Spatialrelationinfo sequences configured by RRC [1].

| Spatialrelationinfo sequence ID | Spatialrelationinfo sequence across PUCCH repetitions |
| --- | --- |
| 1 | {Spatialrelationinfo ID#1, Spatialrelationinfo ID#1, Spatialrelationinfo ID#1, Spatialrelationinfo ID#1} |
| 2 | {Spatialrelationinfo ID#1, Spatialrelationinfo ID#3, Spatialrelationinfo ID#1, Spatialrelationinfo ID#3} |
| 3 | {Spatialrelationinfo ID#2, Spatialrelationinfo ID#4, Spatialrelationinfo ID#2, Spatialrelationinfo ID#4} |
| ... | ... |
| M | {Spatialrelationinfo ID#1, Spatialrelationinfo ID#3, Spatialrelationinfo ID#2, Spatialrelationinfo ID#4} |

Alt 3: spatial relation info for PUCCH for HARQ-ACK transmission for multiple TRPs is indicated by RRC and DCI dynamic spatialrelationinfo update/indication, either a separate field or joint field in DCI is used for indicating spatialrelationinfo sequence. To reduce the signaling overhead, joint field for indicating the PUCCH resource and the spatialrelationinfo sequence is considered Table 3.

TABLE 3

Example of joint field indication for Spatialrelationinfo sequence and PUCCH resource [1]

| ARI field value | PUCCH resource | Spatialrelationinfo sequence |
| --- | --- | --- |
| 000 | Resource #a | Spatialrelationinfo ID#1 for 1st; Spatialrelationinfo ID#2 for 2nd; Spatialrelationinfo ID#3 for 3rd; Spatialrelationinfo ID#4 for $4^{th}$ |
| 001 | Resource #b | Spatialrelationinfo ID#3 for 1st; Spatialrelationinfo ID#1 for 2nd; Spatialrelationinfo ID#4 for 3rd; Spatialrelationinfo ID#2 for $4^{th}$ |
| 010 | Resource #c | Spatialrelationinfo ID#1 for 1st; Spatialrelationinfo ID#1 for 2nd; Spatialrelationinfo ID#1 for 3rd; Spatialrelationinfo ID#1 for $4^{th}$ |
| ... | | |

DL TCI States

For dynamic beam or transmission point selection, a UE can be configured through RRC signaling with up to 128 Transmission Configuration Indicator (TCI) states for PDSCH in Frequency Range 2 (FR2) and up to eight in FR1, depending on UE capability.

Each TCI state contains Quasi Co-Located (QCL) information, i.e., one or two source DL RSs, each source RS associated with a QCL type. For example, a TCI state contains a pair of reference signals, each associated with a QCL type, e-g- two different CSI-RSs {CSI-RS1, CSI-RS2} is configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e., the RX beam to use) from CSI-RS2.

The list of TCI states can be interpreted as a list of possible beams transmitted from the network or a list of possible TRPs used by the network to communicate with the UE.

For PDSCH transmission, up to 8 TCI states or pair of TCI states may be activated by MAC CE and a UE may be dynamically indicated by a TCI codepoint in DCI one or two of the activated TCI states for PDSCH reception.

CORESET (Control Resource Set)

A UE monitors a set of PDCCH candidates in one or more CORESETs on an active DL Bandwidth Part (BWP) on each activated serving cell configured with PDCCH monitoring according to corresponding search space sets where monitoring implies decoding each PDCCH candidate according to the monitored DCI formats. For each CORESET, one TCI state is activated by MAC CE.

Improved systems and methods are needed for transmitting UCI.

SUMMARY

Systems and methods of Physical Uplink Control Channel (PUCCH) reliability are provided. In some embodiments, a method performed by a wireless device for transmitting Uplink Control Information (UCI) includes: receiving an activation command to activate a first spatial relation and a second spatial relation out of a plurality of spatial relations; determining the first spatial relation and the second spatial relation based on one or more Downlink (DL) Transmission Configuration Indicator (TCI) states; transmitting the UCI according to the first spatial relation in a first set of symbols or slots; and transmitting the UCI according to the second spatial relation in a second set of symbols or slots. In this way, fewer changes to the specifications are required. In some embodiments, the existing RRC configuration for spatial relations and MAC CE activation for spatial relations can be used. Instead of selecting one, two or more spatial relations may be selected by the MAC CE. Also, since the multiple spatial relations are associated with each PUCCH resource, the existing DCI can be used in which a PUCCH resource is selected by the PRI bits. Additionally, some embodiments provide more flexibility. Since MAC CE is used to select two or more spatial relations from the list of RRC configured spatial relations, different combinations can be easily selected dynamically.

Certain aspects of the present disclosure and their embodiments may provide solutions to the aforementioned or other challenges. The proposed solution includes one or more of:

Activate more than one spatial relation for a PUCCH resource by a MAC CE from a list of spatial relations configured by RRC. Applying the different spatial relations in different symbols of a PUCCH resource, or applying the different spatial relations in different PUCCH transmission occasions with PUCCH repetition, and applying the different spatial relations only when certain conditions are met. Dynamic indicating a set of spatial relations for a PUCCH resource in DCI out of multiple activated sets of spatial relations each may contain one or more spatial relations. Linking spatial relations for a PUCCH resource to DL TCI states indicated in DCI scheduling an associated PDSCH. Linking spatial relations for a PUCCH resource to DL TCI states of CORESETs associated with a search space set over which an associated PDCCH is received.

There are, proposed herein, various embodiments which address one or more of the issues disclosed herein. In some embodiments, a method performed by a wireless device for transmitting UCI. The method comprising at least one of: receiving an activation command to activate a first spatial relation and a second spatial relation out of a plurality of spatial relations; determining the first spatial relation and the second spatial relation based on one or more DL TCI states; transmitting the Uplink Control Information (UCI) according to the first spatial relation in a first set of symbols or slots; and transmitting the UCI according to the second spatial relation in a second set of symbols or slots.

In some embodiments, the plurality of spatial relations is for a PUCCH resource. In some embodiments, each spatial relation contains at least a DL reference signal. In some embodiments, the UCI in the second set of symbols is a repetition of the UCI in the first set of symbols within a same slot.

In some embodiments, a time and frequency resource in the first set of symbols is specified by the PUCCH resource. In some embodiments, the UCI is carried with short PUCCH Format 0 or 2. In some embodiments, the UCI is carried with PUCCH Format 1 or 3 or 4.

In some embodiments, the UCI transmitted in the second set of slots is a repetition of the UCI transmitted in the first set of slots, wherein a time and frequency resource in each slot for the UCI is specified by the PUCCH resource.

In some embodiments, the method also includes signaling a total number of slots for one or more of the first and the second set of slots.

In some embodiments, the transmitting UCI according to the first spatial relation in a first set of symbols or slots and according to the second spatial relation in a second set of symbols or slots is done when a condition is met. In some embodiments, the condition comprises one or more of: more than one TCI state is indicated in a DCI scheduling a PDSCH for which a HARQ A/N is to be transmitted in the PUCCH resource; a high priority is indicated in a DCI scheduling a PDSCH for which a HARQ A/N is to be transmitted in the PUCCH resource; and a UCI associated with a certain traffic type.

In some embodiments, the activation command is carried by a MAC CE. In some embodiments, the MAC CE activates the first and second spatial relation for more than one PUCCH resource.

In some embodiments, the method also includes receiving the plurality of spatial relations. In some embodiments, receiving the plurality of spatial relations comprises receiving an RRC configuration of the plurality of spatial relations.

In some embodiments, the activation command activates an UL TCI state out of a plurality of UL TCI states for a PUCCH resource. In some embodiments, the UL TCI state contains a first and a second DL reference signal.

In some embodiments, transmitting the UCI according to the first spatial relation or the second spatial relation comprises transmitting the UCI according to the first DL reference signal in the first set of symbols or slots and according to the second DL reference signal in the second set of symbols or slots.

In some embodiments, the one or more DL TCI states are one or more of: DL TCI states indicated in a DCI scheduling a PDSCH for which a HARQ A/N is to be carried on the PUCCH resource; and DL TCI states of one or more Control Resource Sets, CORESETs, over which a DCI scheduling a PDSCH is detected and for which a HARQ A/N is to be carried on the PUCCH resource.

In some embodiments, the wireless device operates in a NR communications network.

Certain embodiments may provide one or more of the following technical advantage(s). Fewer changes to the specifications are required. In some embodiments, the existing RRC configuration for spatial relations and MAC CE activation for spatial relations can be used. Instead of selecting one, two or more spatial relations may be selected by the MAC CE. Also, since the multiple spatial relations are associated with each PUCCH resource, the existing DCI can be used in which a PUCCH resource is selected by the PRI bits. Additionally, some embodiments provide more flexibility. Since MAC CE is used to select two or more spatial relations from the list of RRC configured spatial relations, different combinations can be easily selected dynamically.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
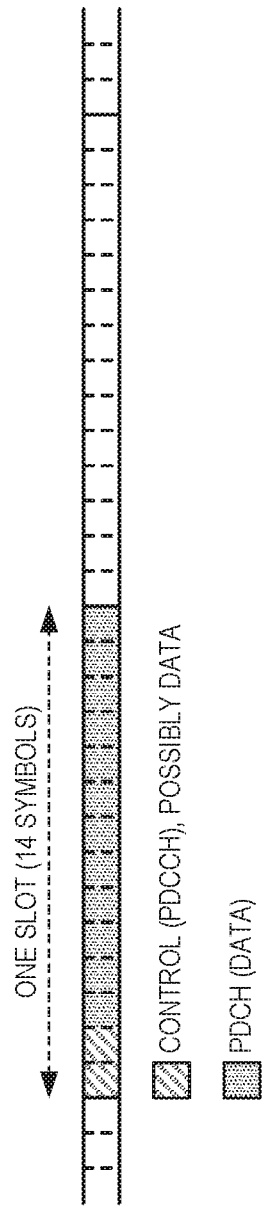
FIG. 1 illustrates data scheduling in New Radio (NR) is typically in slot basis.
Figure 2:
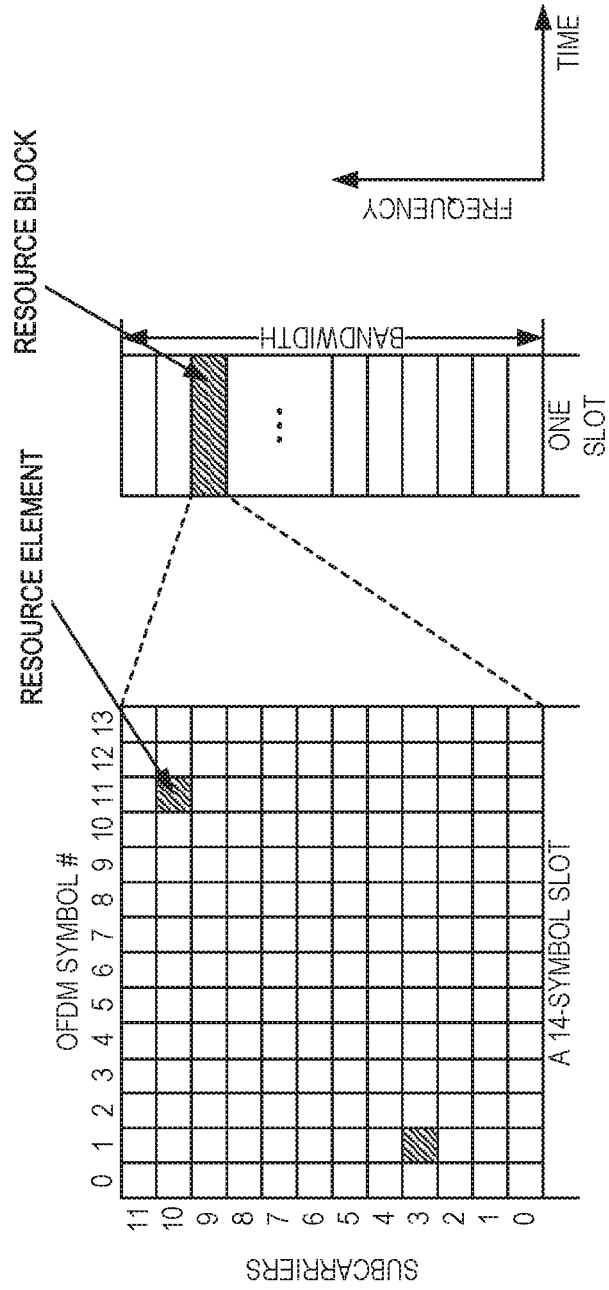
FIG. 2 illustrates a basic NR physical time-frequency resource grid.
Figure 3:
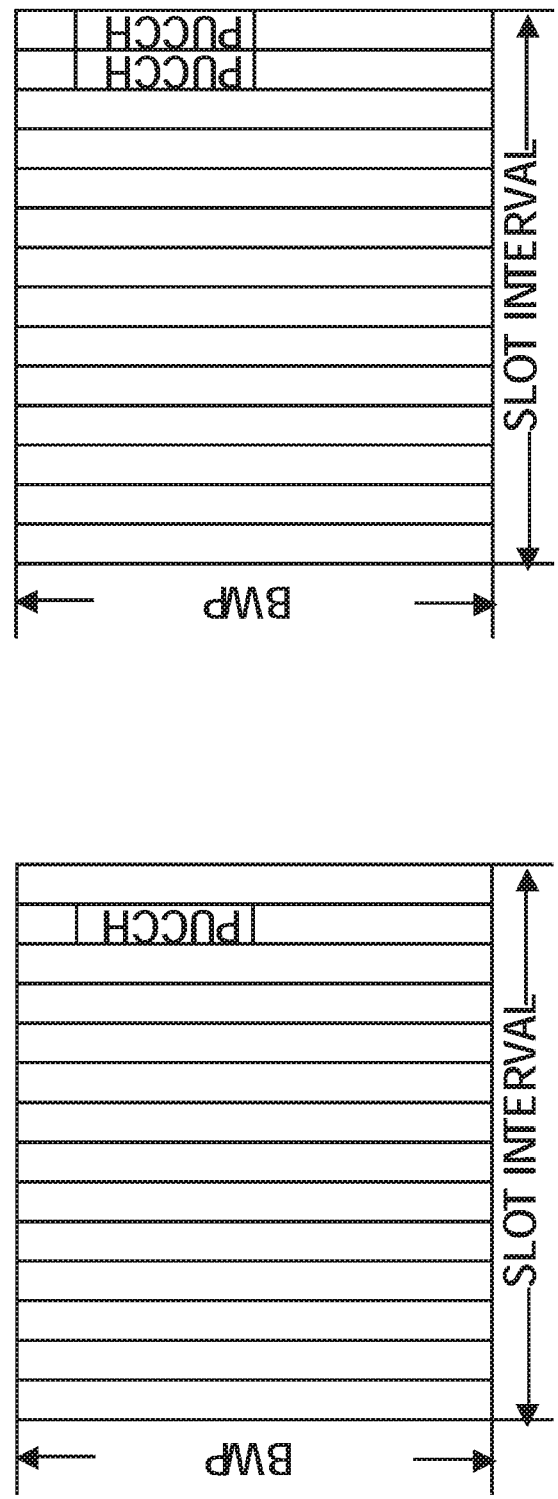
FIG. 3 illustrates an example of one and two symbol short Physical Uplink Control Channel (PUCCH) without Frequency Hopping (FH)
Figure 4:
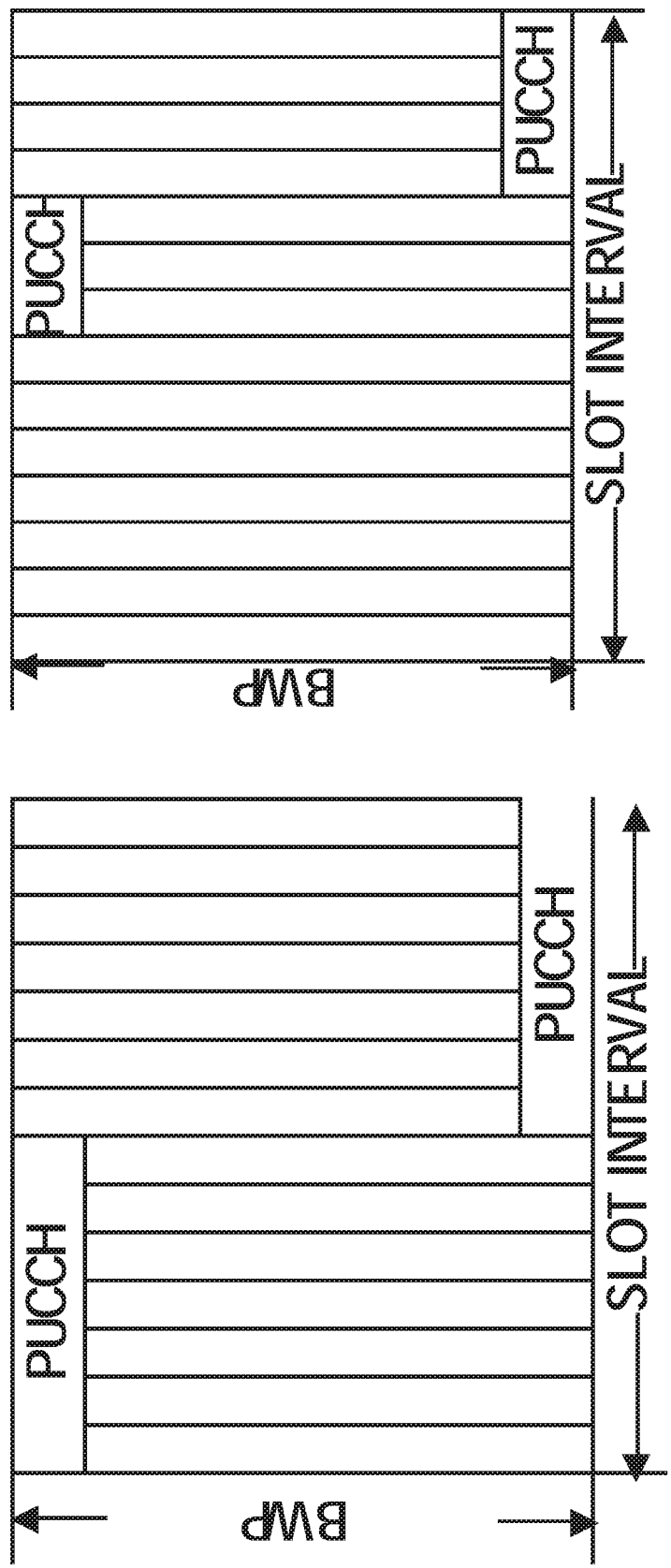
FIGS. 4 and 5 illustrate an example 14-symbol and 7-symbol long PUCCH with intra-slot FH enabled.
Figure 5:
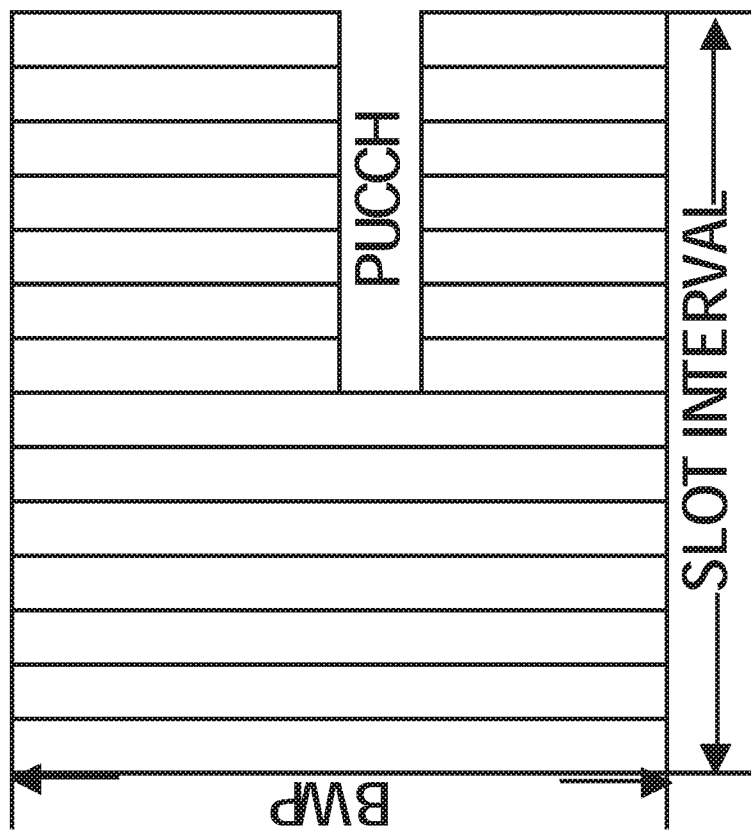
Figure 5:
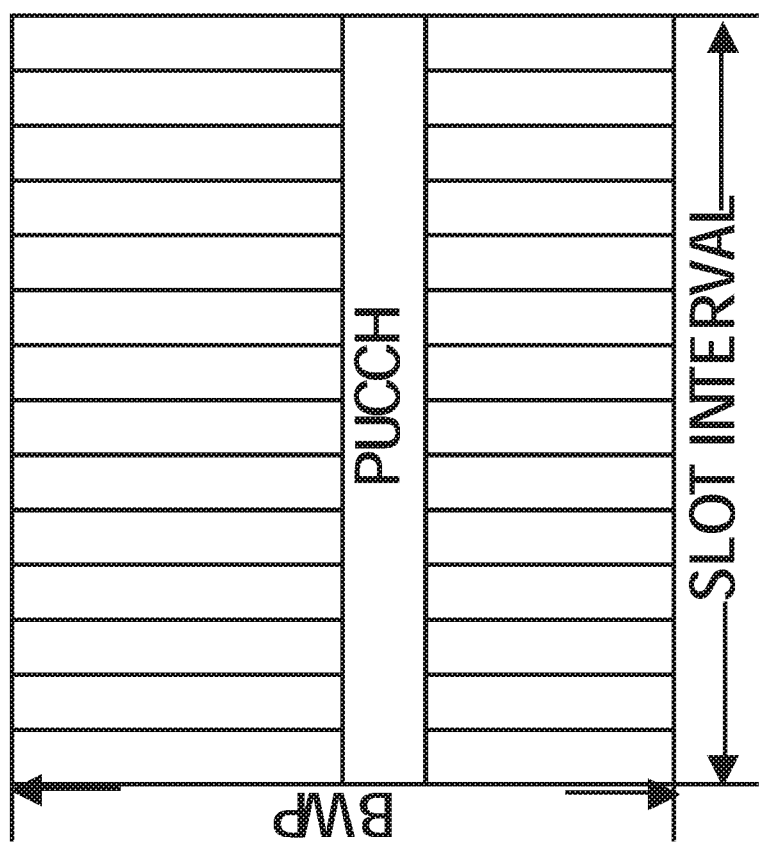
Figure 6:
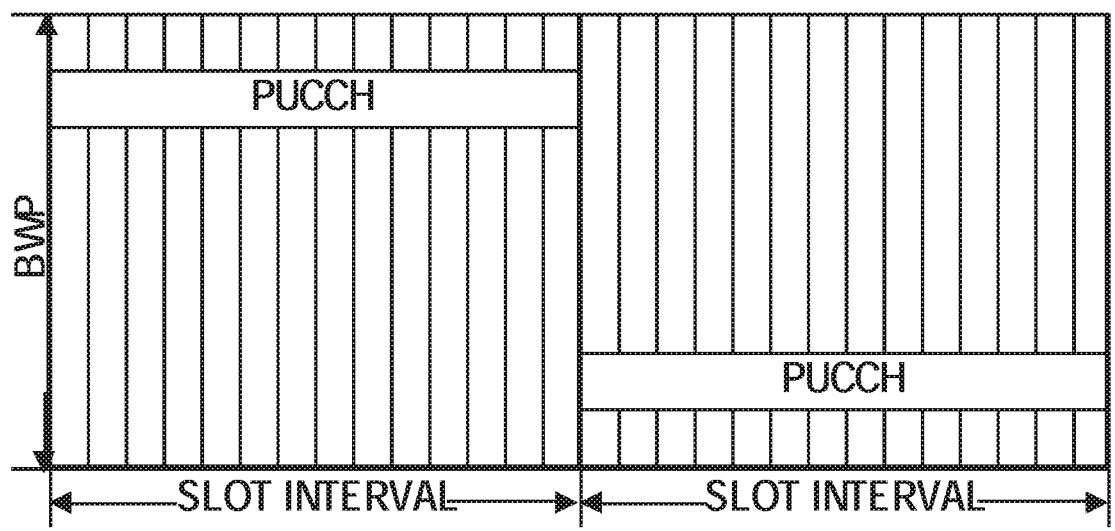
FIG. 6 illustrates an example of PUCCH repetition in two slots with (a) inter-slot FH enabled and (b) inter-slot FH disabled while intra-slot FH enabled.
Figure 6:
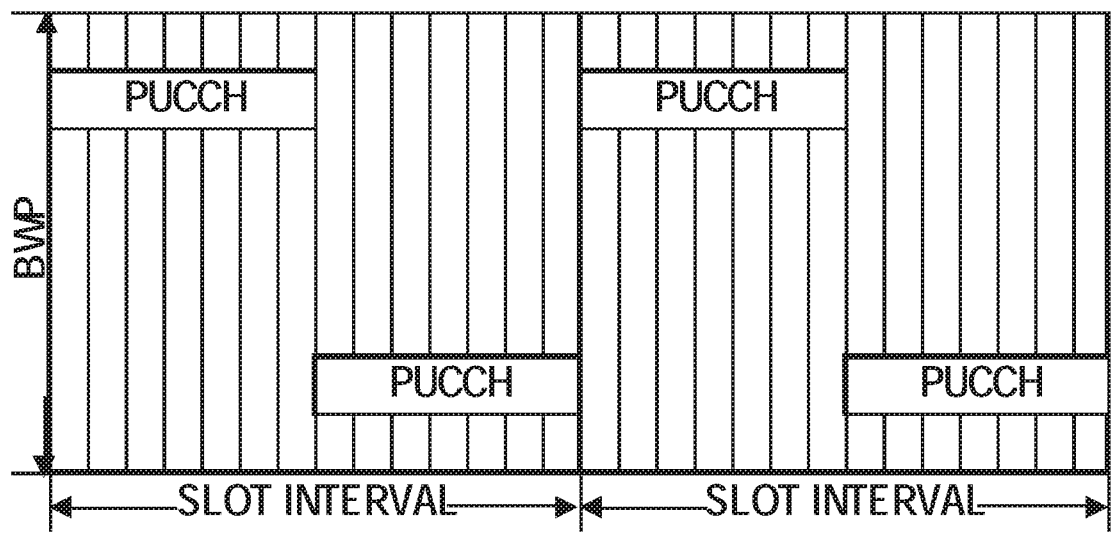
Figure 7:
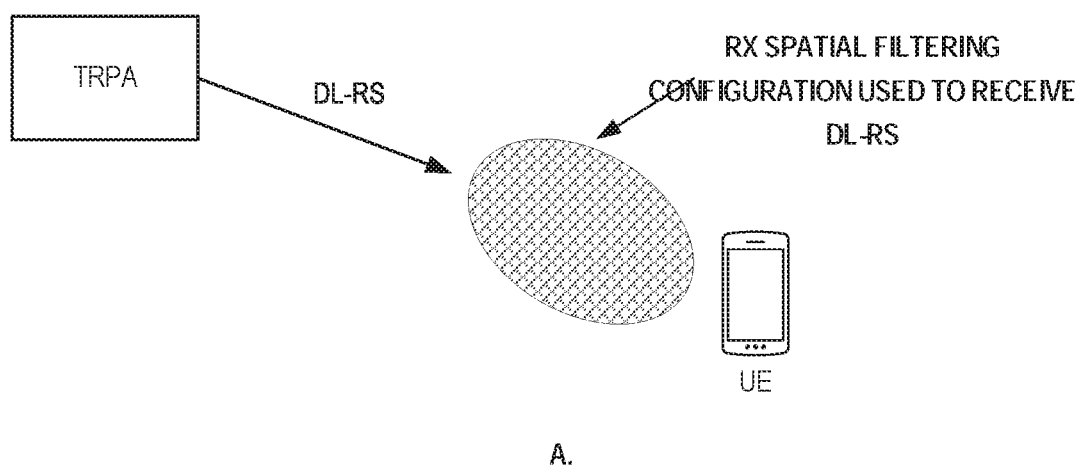
FIG. 7 illustrates an example of using spatial relation for PUCCH.
Figure 7:
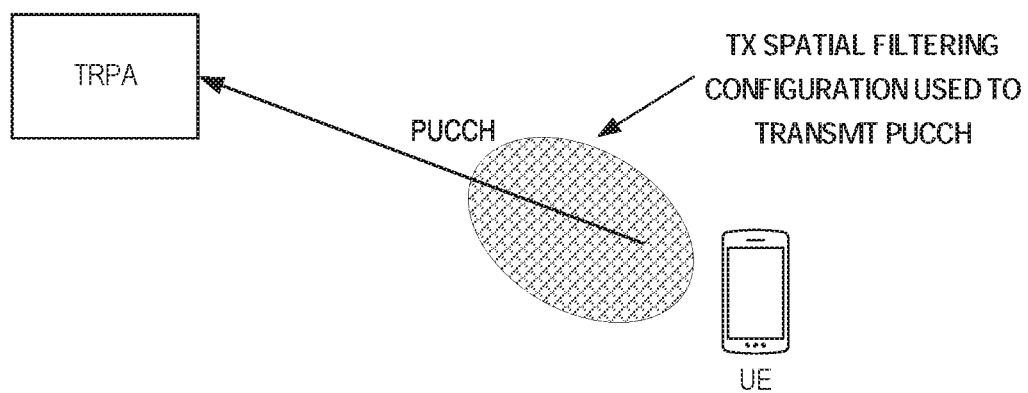
Figure 8:
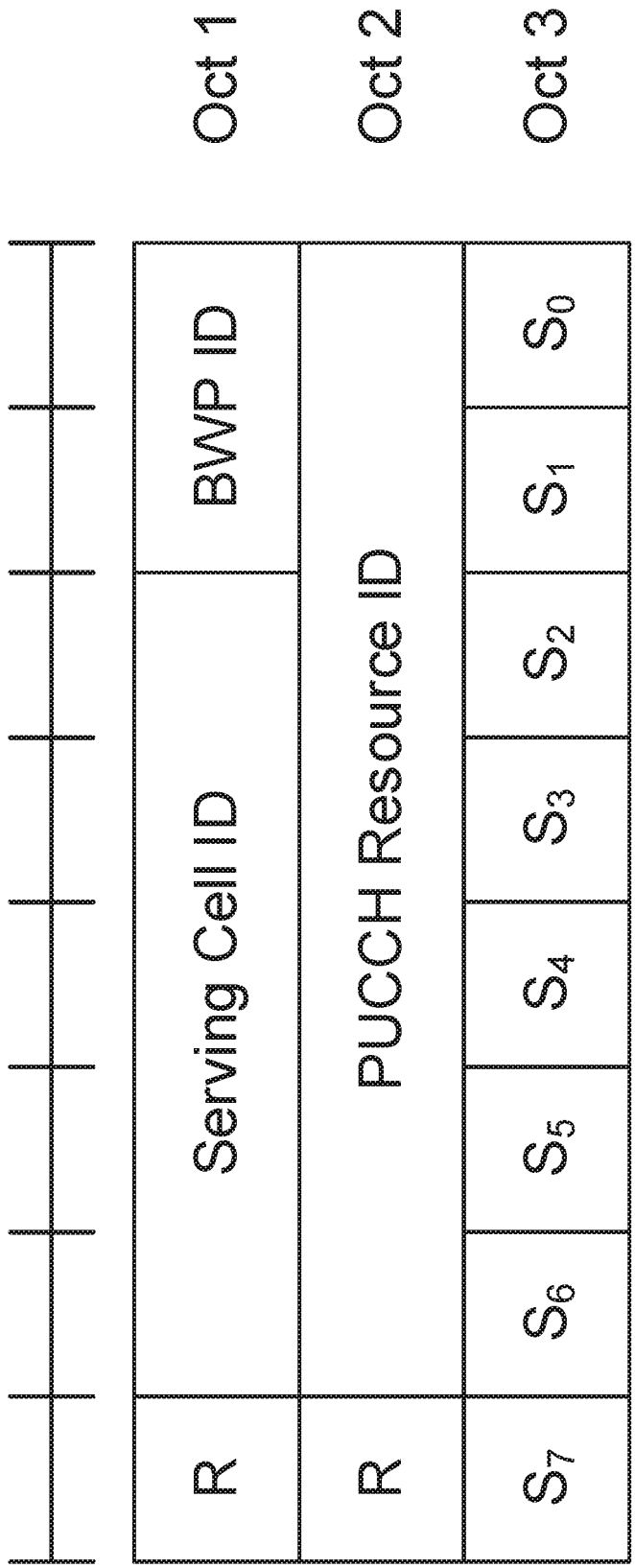
FIG. 8 illustrates the Medium Access Control (MAC) Control Element (CE) for activation/deactivation for PUCCH spatial relation.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 10:
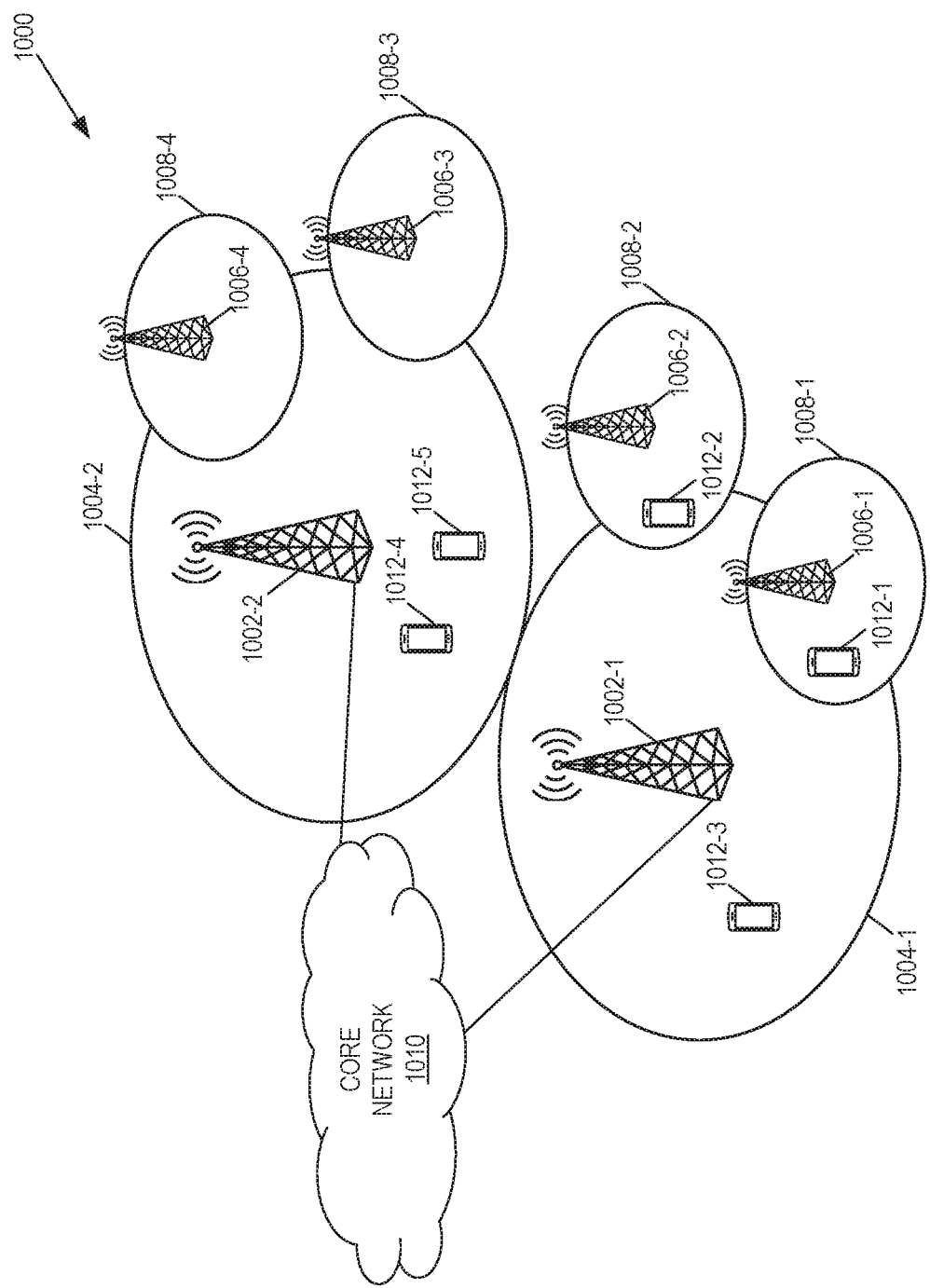
FIG. 10 illustrates one example of a cellular communications system in which embodiments of the present disclosure may be implemented.

FIG. 10 illustrates one example of a cellular communications system 1000 in which embodiments of the present disclosure may be implemented. In the embodiments described herein, the cellular communications system 1000 is a 5G system (5GS) including a NR RAN or LTE RAN (i.e., E-UTRA RAN) or an Evolved Packet System (EPS) including a LTE RAN. In this example, the RAN includes base stations 1002-1 and 1002-2, which in LTE are referred to as eNBs (when connected to EPC) and in 5G NR are referred to as gNBs (e.g., LTE RAN nodes connected to 5GC, which are referred to as gn-eNBs), controlling corresponding (macro) cells 1004-1 and 1004-2. The base stations 1002-1 and 1002-2 are generally referred to herein collectively as base stations 1002 and individually as base station 1002. Likewise, the (macro) cells 1004-1 and 1004-2 are generally referred to herein collectively as (macro) cells 1004 and individually as (macro) cell 1004. The RAN may also include a number of low power nodes 1006-1 through 1006-4 controlling corresponding small cells 1008-1 through 1008-4. The low power nodes 1006-1 through 1006-4 can be small base stations (such as pico or femto base stations) or Remote Radio Heads (RRHs), or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The cellular communications system 1000 also includes a core network 1010, which in the 5GS is referred to as the 5G core (5GC). The base stations 1002 (and optionally the low power nodes 1006) are connected to the core network 1010.

The base stations 1002 and the low power nodes 1006 provide service to wireless communication devices 1012-1 through 1012-5 in the corresponding cells 1004 and 1008. The wireless communication devices 1012-1 through 1012-5 are generally referred to herein collectively as wireless communication devices 1012 and individually as wireless communication device 1012. In the following description, the wireless communication devices 1012 are oftentimes UEs, but the present disclosure is not limited thereto.

Figure 9:
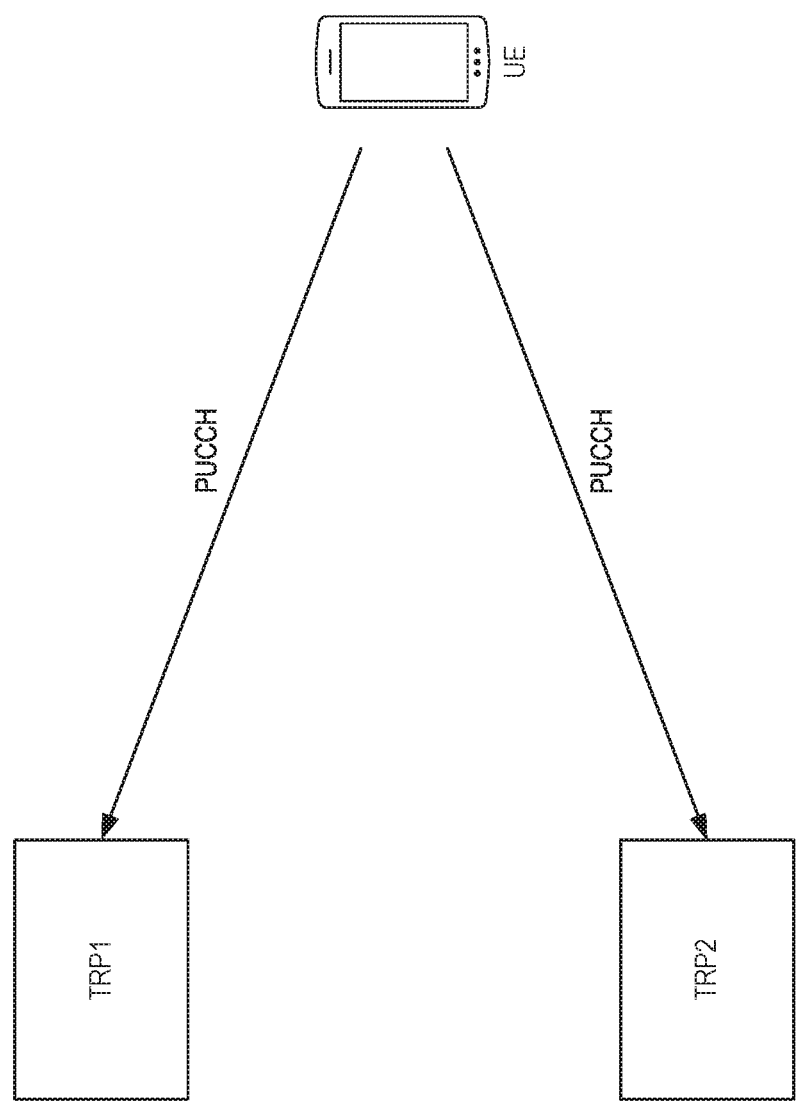
FIG. 9 illustrates PUCCH enhancement with multiple Transmission and Reception Points (TRPs) by repeating a PUCCH towards to different TRPs.

In NR Rel-17, it has been proposed to introduce further Physical Uplink Control Channel (PUCCH) enhancement with multiple Transmission and Reception Points (TRPs) by repeating a PUCCH towards to different TRPs as shown in FIG. 9. As discussed above, three methods were proposed in [1]. There currently exist certain challenges. Alt 1 is not practical as it can configure only a single spatial relation sequence semi-statically and will not be able to adapt to fast beam changes. The issue with Alt 1 could be mitigated somewhat by Alt 2. However, Alt 2 assumes that PUCCH repetition are applied for all PUCCH resources and regardless of what type of UCI or associated traffic type is carried by a PUCCH. This is not efficient as in practice, only certain types of UCI such as UCI associated with Ultra-Reliable Low Latency Communication (URLLC) traffic may need to be repeated to improve reliability.

For Alt 3, PRI is used for joint PUCCH resource and spatial relation sequence selection. Given that PRI consists of only three bits, the selection flexibility is very limited. It should be noted that in NR Rel-16, the number of spatial relations for PUCCH is up to 64. To indicate a spatial relation sequence consisting of two distinct spatial relations will involve 64*63=4032 different spatial relation sequences. Hence, using the 3 bit PRI field to jointly select the PUCCH resource and the spatial relation sequence as proposed in Alt 3 is impractical for NR Rel-16 UEs supporting up to 64 spatial relations for PUCCH.

Furthermore, a list of spatial relation sequences, each contains multiple spatial relations, needs to be configured by RRC in all three cases. Given large number of possible beams (and associated reference signals) per TRP, the combinations of these beams over multiple TRPs, i.e., the number of spatial relation sequences, can be large.

Systems and methods of PUCCH reliability are provided. In some embodiments, a method performed by a wireless device for transmitting UCI includes: receiving an activation command to activate a first spatial relation and a second spatial relation out of a plurality of spatial relations; determining the first spatial relation and the second spatial relation based on one or more DL TCI states; transmitting the UCI according to the first spatial relation in a first set of symbols or slots; and transmitting the UCI according to the second spatial relation in a second set of symbols or slots. In this way, fewer changes to the specifications are required. In some embodiments, the existing RRC configuration for spatial relations and MAC CE activation for spatial relations can be used. Instead of selecting one, two or more spatial relations may be selected by the MAC CE. Also, since the multiple spatial relations are associated with each PUCCH resource, the existing DCI can be used in which a PUCCH resource is selected by the PRI bits. Additionally, some embodiments provide more flexibility. Since MAC CE is used to select two or more spatial relations from the list of RRC configured spatial relations, different combinations can be easily selected dynamically.

Figure 11:
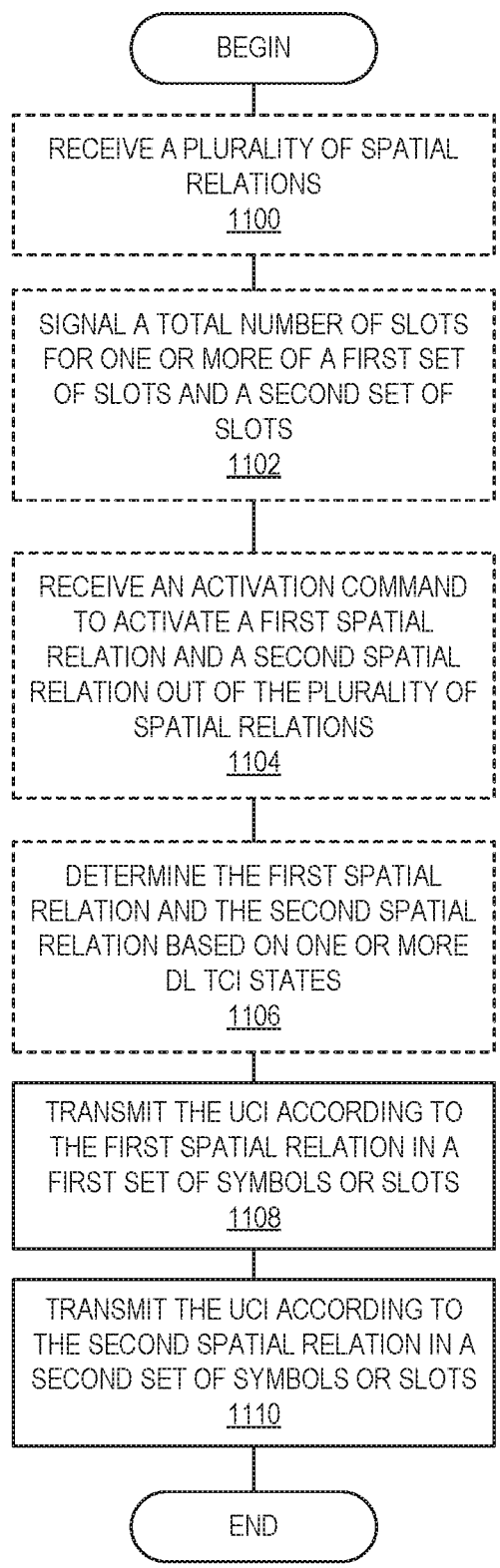
FIG. 11 illustrates a method of operating a wireless device for transmitting UCI, according to some embodiments of the current disclosure.

FIG. 11 illustrates a method of operating a wireless device for transmitting UCI, according to some embodiments of the current disclosure. In some embodiments, the wireless device optionally receives a plurality of spatial relations (step 1100). The wireless device also optionally signals a total number of slots for one or more of the first and the second set of slots (step 1102). The wireless device optionally receives an activation command to activate a first spatial relation and a second spatial relation out of a plurality of spatial relations (step 1104). In some embodiments, the wireless device optionally determines the first spatial relation and the second spatial relation based on one or more DL TCI states (step 1106). The wireless device transmits the UCI according to the first spatial relation in a first set of symbols or slots (step 1108) and transmits the UCI according to the second spatial relation in a second set of symbols or slots (step 1110).

Figure 12:
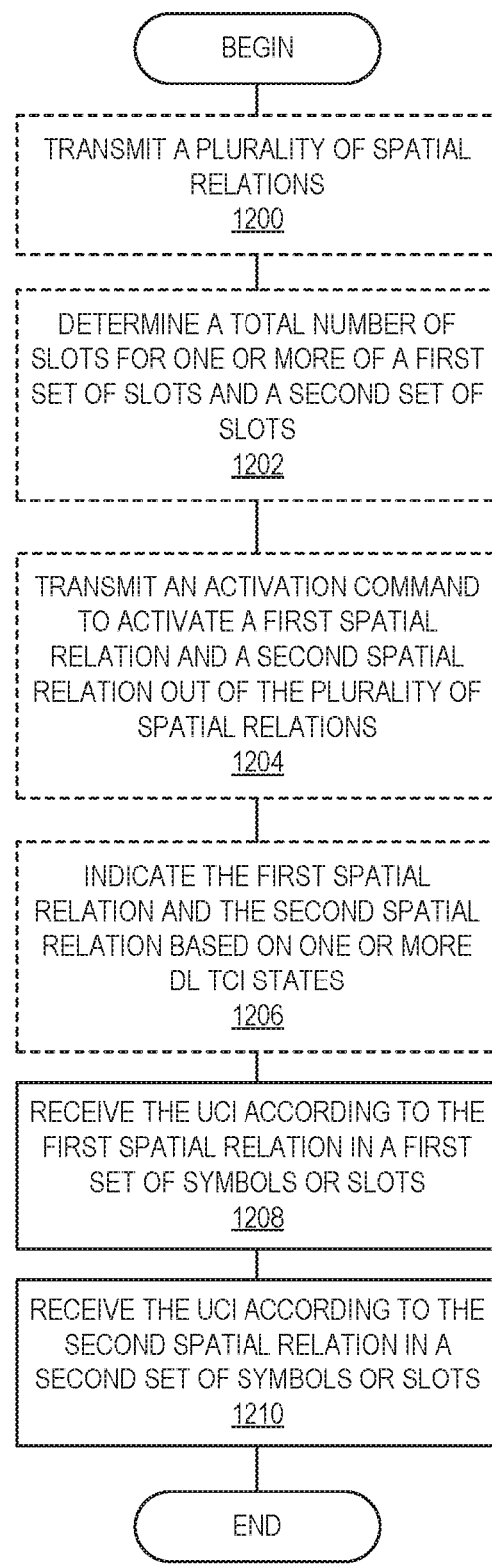
FIG. 12 illustrates a method of operating a base station for receiving Uplink Control Information (UCI), according to some embodiments of the current disclosure.

FIG. 12 illustrates a method of operating a base station for receiving UCI, according to some embodiments of the current disclosure. In some embodiments, the base station optionally transmits the plurality of spatial relations (step 1200). The base station also optionally determines a total number of slots for one or more of the first and the second set of slots (step 1202). The base station optionally transmits an activation command to activate a first spatial relation and a second spatial relation out of a plurality of spatial relations (step 1204). In some embodiments, the base station optionally indicates the first spatial relation and the second spatial relation based on one or more DL TCI states (step 1206). The base station receives the UCI according to the first spatial relation in a first set of symbols or slots (step 1208) and receives the UCI according to the second spatial relation in a second set of symbols or slots (step 1210).

Figure 13:
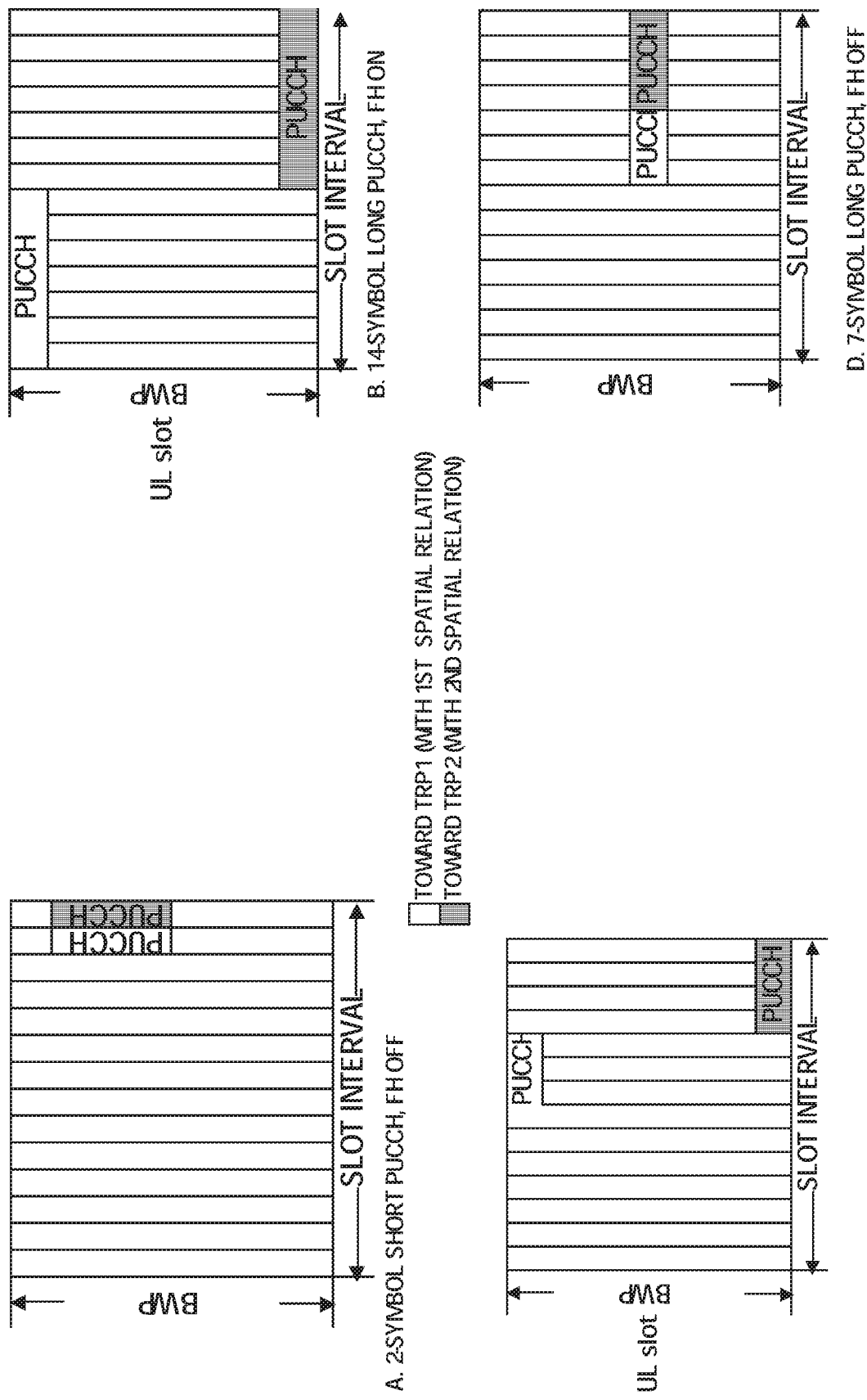
FIG. 13 illustrates a UCI to be sent in the PUCCH resource with more than one spatial relation is sent toward different beams or TRPs specified by the spatial relations in different OFDM symbols or different RBs, according to some embodiments of the current disclosure.

In this embodiment, a PUCCH resource may be configured or activated with more than one PUCCH spatial relation, where each spatial relation is associated with a DL RS or a beam from a TRP. Each PUCCH spatial relation may contain at least a DL reference signal (e.g., NZP CSI-RS, SSB, or SRS), a reference signal for pathloss calculation, and power control parameters such as p0-PUCCH and closedloop index. To simplify discussion, only "spatial relation" may be used in the following discussions. Unless it is specifically stated, "spatial relation" refers to PUCCH spatial relation. A UCI to be sent in the PUCCH resource with more than one spatial relation is sent toward different beams or TRPs specified by the spatial relations in different OFDM symbols or different RBs. Some examples are shown in FIG. 13. In FIG. 13A, a two-symbol PUCCH with format 0 or 2 is sent according to a first spatial relation (e.g., toward TRP1) in a first symbol and a second spatial relation (e.g., toward TRP2) in a second symbol.

In FIG. 13B a 14-symbol PUCCH with format 1 or 3 or 4 and with Frequency Hopping (FH) turned on is sent according to a first spatial relation (e.g., toward TRP1) in the first 7 symbols and a second spatial relation (e.g., toward TRP2) in the last 7 symbols. Similarly, in FIG. 13C a 7-symbol PUCCH with format 1 or 3 or 4 and with frequency hopping turned on is sent according to a first spatial relation (e.g., toward TRP1) in the first three symbols and a second spatial relation (e.g., toward TRP2) in the last four symbols. FIG. 13C shows an example of a 7-symbol PUCCH with Format 1 or 3 or 4 without FH.

The more than one spatial relation may be applied only when certain conditions are satisfied. For example, when at least one TCI codepoint indicates two TCI states or the PUCCH is associated with certain DL or UL traffic such as URLLC traffic.

In release 16, spatial relations for PUCCH and SRS are separately configured. For an SRS resource, its spatial relation is configured by RRC in SRS-SpatialRelationInfo, where a DL reference signal (e.g., NZP CSI-RS, SSB, or another SRS) is specified. Power control parameters for SRS are configured for each SRS resource set, which may contain one or more SRS resources. For PUSCH, its spatial relation is the same as the SRS spatial relation for a SRS resource indicated in a DCI scheduling the PUSCH. A common part of the spatial relations for PUCCH and SRS are that they are indicated by pointing to a DL reference signal directly for UL transmission. Similar to DL, UL TCI state may be introduced to unify the spatial relation indication for UL channel and signals. There are several options if UL TCI state is defined. UL TCI state may be defined as single reference signal which is used as the spatial relation. UL TCI state may be optionally defined as set of reference signals used in a predefined way for spatial relations. UL TCI state, or an alternative e.g., UL transmission state, may be defined as a set of reference signals to be used as spatial relation and/or associated path loss reference signal(s) and/or some specific configuration about given UL transmission. Thus, in another embodiment, when UL TCI is defined, a UL TCI state with more than one DL reference signal, or more than one TCI state each with one DL reference signal, may be activated for a PUCCH resource.

In below embodiments, sometimes UL TCI state may be mentioned, and sometimes spatial relation may be mentioned. It should be understood that in some cases, either spatial relation, or UL TCI state, or UL transmission state could apply in the said context.

Enhanced PUCCH Reliability Through PUCCH Repetition Towards Multiple TRPs

Figure 14:
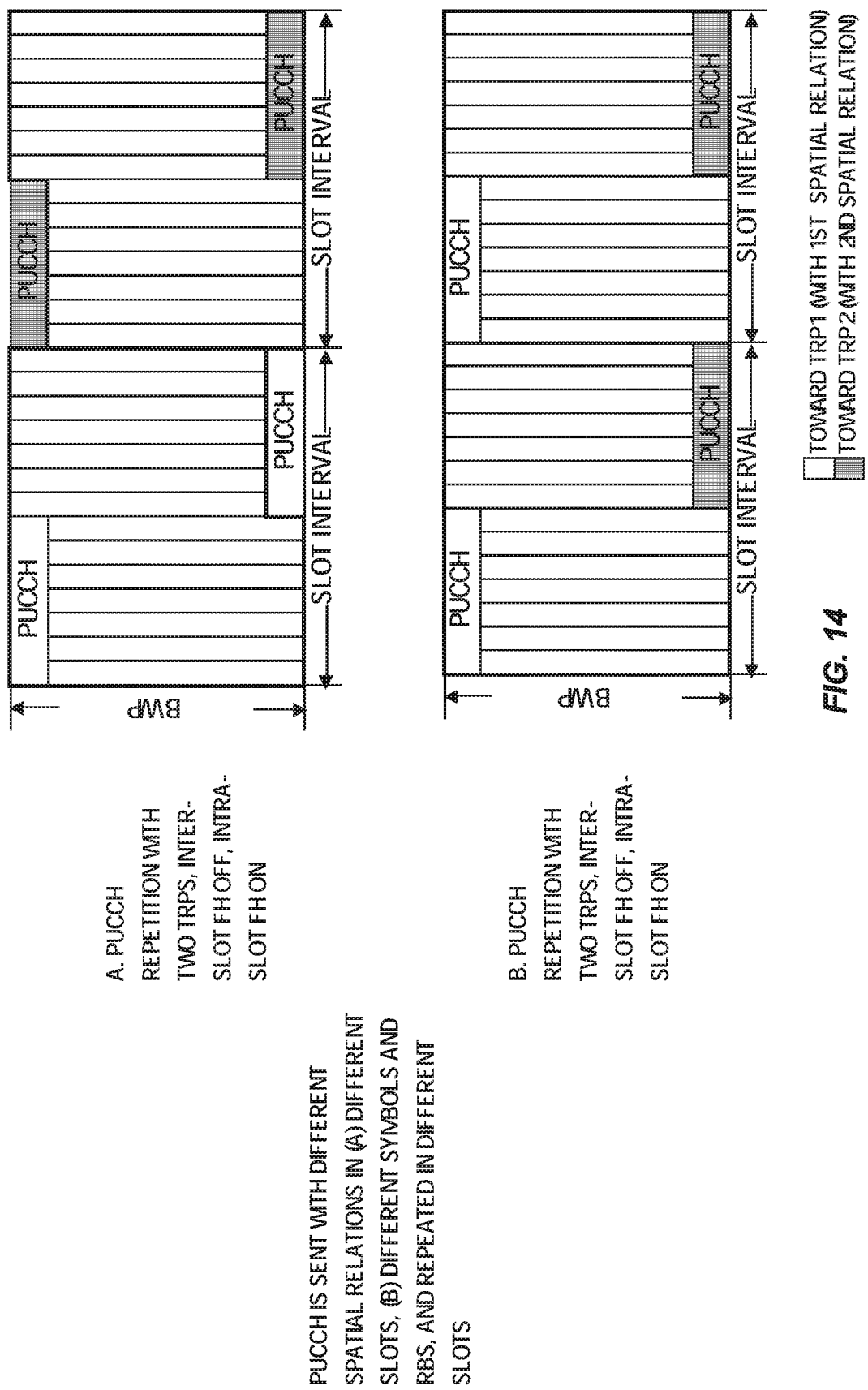
FIG. 14 illustrates a UCI in the PUCCH resource with more than one spatial relation may be repeated in time or frequency domain, according to some embodiments of the current disclosure.

In this embodiment, a UCI in the PUCCH resource with more than one spatial relation may be repeated in time or frequency domain. In one scenario, the PUCCH may be sent toward different beams or TRPs specified by the spatial relations in different slots. An example is shown in FIG. 14A, where a 14-symbol PUCCH with Format 1 or 3 or 4 and with frequency hopping turned on is sent according to a first spatial relation (e.g., toward TRP1) in the first slot and a second spatial relation (e.g., toward TRP2) in the second slot. In this case, diversity over both TRP and frequency can be achieved. The PUCCH may be either decoded separately in each TRP, in which case a successful decoding is achieved if the PUCCH is decoded in any one of the TRPs, or jointly decoded via soft combining of the two copies of the PUCCH.

In another scenario, the PUCCH may be sent toward different beams or TRPs specified by the spatial relations in different symbols or RBs within a slot and repeated in different slot. An example is shown in FIG. 14B, where a 14-symbol PUCCH with Format 1 or 3 or 4 and with frequency hopping turned on is sent according to a first spatial relation (e.g., toward TRP1) in the first seven symbols and a second spatial relation (e.g., toward TRP2) in the last seven symbols in the first slot. The same is then repeated in the second slot. In this case, joint decoding is needed by combining the received PUCCH signals from the two TRPs. Since each TRP only receives the PUCCH over one frequency range, there is no frequency diversity within each TRP.

Examples of UL TCI state or UL transmission state for this embodiment are:
  UL TCI state is the first or second spatial relation mentioned above
  UL TCI state is the set of spatial relations to be used in a given UL symbols, e.g., first spatial relation to be used in the first x symbols and second spatial relation to be used in the following y symbols.

Figure 15:
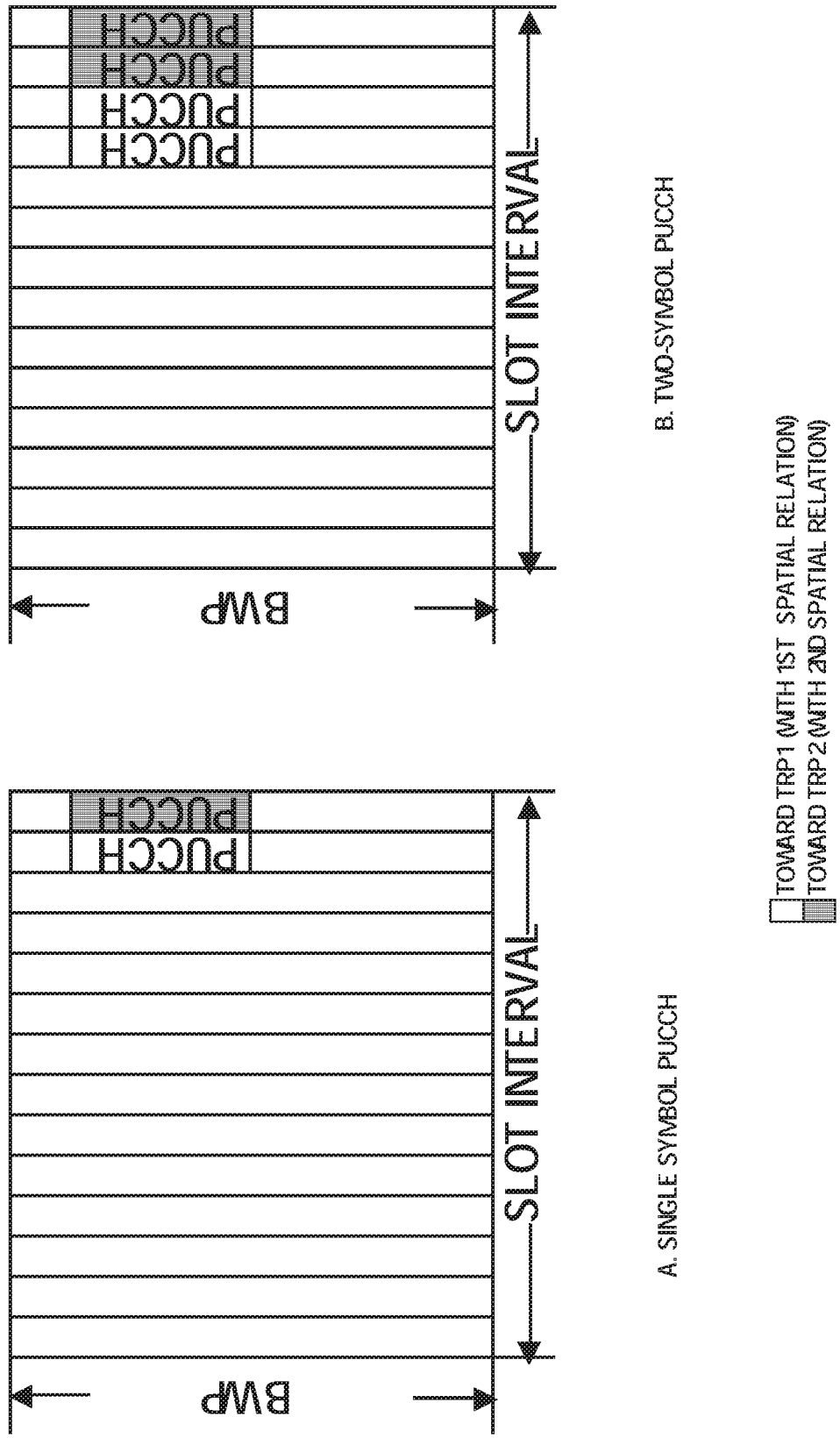
FIG. 15 illustrates the repetition may also be done in symbol level within a slot for PUCCH Format 0 or 2, according to some embodiments of the current disclosure.

The repetition may also be done in symbol level within a slot for PUCCH Format 0 or 2. FIG. 15A shows an example of single symbol PUCCH that is repeated within a slot, while FIG. 15B shows an example two-symbol PUCCH that is repeated within a slot.

In one embodiment, the same base sequence(s), cyclic shift(s), and RB(s) are applied in the second PUCCH transmission occasion to the second TRP. In another embodiment, different cyclic shift(s) may be used in the second PUCCH transmission occasion through cyclic shift hopping.

The number of repetitions may be either implicitly or explicitly indicated. For example, implicit indication may be used for PUCCH Format 0 or 2 carrying HARQ A/N for a PDSCH scheduled by a DCI in which 2 TCI states are indicated. In that case, the PUCCH may be repeated two times over consecutive symbols. Alternatively, a gap in symbols between the starting symbol of the second repetition and the last symbol of the first repetition may be configured.

For PUCCH Formats 1, 3, and 4, a list of number of repetitions may be semi-statically configured by RRC and dynamically selected by MAC CE. The same starting symbol may be used in each slot.

Figure 16:
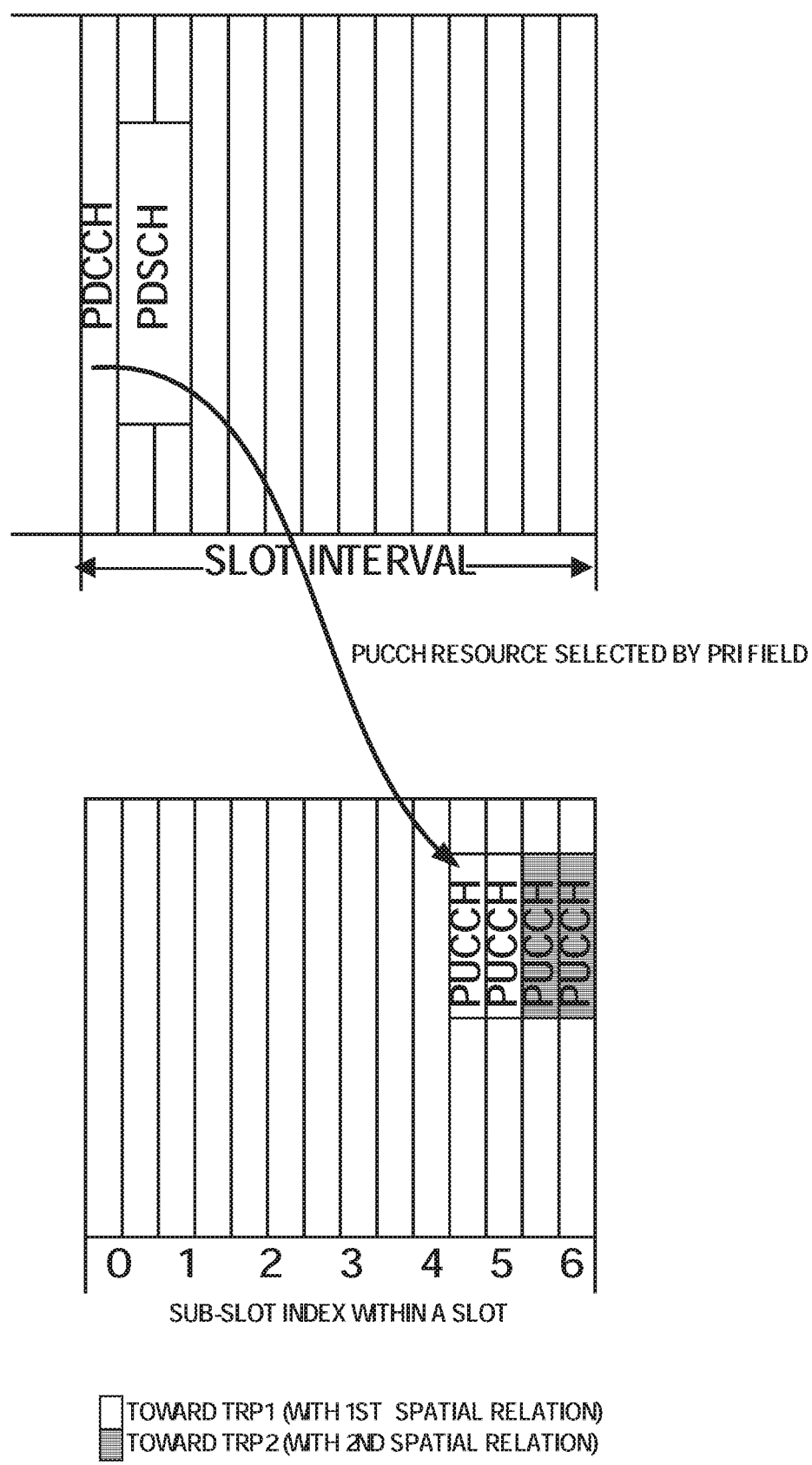
FIG. 16 shows an example of a 2-symbol PUCCH that is first transmitted in sub-slot 5 towards TRP1 with $1^{st}$ spatial relation, according to some embodiments of the current disclosure.

In another embodiment, the PUCCH repetition may also be done in sub-slot level within a slot. FIG. 16 shows an example of a 2-symbol PUCCH that is first transmitted in sub-slot 5 towards TRP1 with $1^{st}$ spatial relation. The sub-slot in which the first repetition is transmitted is given by the PDSCH-to-HARQ feedback timing indicator field in DCI carried by the scheduling PDCCH. The PUCCH resource is selected by the PRI field in DCI carried by the scheduling PDCCH. The 2-symbol PUCCH is next repeated in sub-slot 6 towards TRP2 with $2^{Nd}$ spatial relation.

The order of PUCCH repetition may follow the order of the spatial relations activated. For example, if two spatial relations with indices of i and j (i<j) are activated, the first PUCCH transmission is according to spatial relation with index i and the next PUCCH transmission is according to spatial relation with index j. If more than two repetitions are configured, the even numbered PUCCH transmissions may be according to spatial relation with index i and the odd numbered PUCCH transmissions may be according to spatial relation with index j, or the other way around. Alternatively, a fixed pattern may be configured by RRC such as [i, i, j, j, i, i, j, j, . . . ] where the same spatial relation is used in two consecutive PUCCH transmission occasions.

The repetition may be enabled only when the UCI carried by a PUCCH is associated with certain downlink or UL traffics, such as URLLC traffic. For example, a PUCCH may be repeated only if it carries HARQ A/N for a DL PDSCH for URLLC, which may be indicated with a higher priority indication in the DCI scheduling the PDSCH.

A time gap may be configured between two PUCCH occasions toward different TRPs within a slot, Activating More Than One Spatial Relation for a PUCCH Resource In one embodiment, a MAC CE may be used to activate more than one spatial relation for a PUCCH resource out of a list of RRC configured spatial relations. In one particular example, such a MAC CE may indicate at least the following:
1. a PUCCH Resource ID of the PUCCH resource for which spatial relation is updated/indicated; and
2. up to 64 bits representing the up to 64 spatial relations that can be configured per PUCCH resource, of which N>1 of the 64 bits indicate N>1 activated spatial relations for the indicated PUCCH resource.

In another example, a MAC CE activating more than one spatial relation for a PUCCH resource may indicate at least the following:
1. a PUCCH Resource ID of the PUCCH resource for which spatial relation is updated/indicated; and
2. up to N>1 spatial relation IDs to indicate the N>1 activated spatial relations activated for the indicated PUCCH resource.
   a. If N is RRC configured or fixed in specification, the PUCCH resource ID is followed by N spatial relation, or UL TCI state, or UL transmission state IDs
   b. If N is not RRC configured or fixed in specification, the MAC CE may include a field C which gives the number of these IDs. This field is needed if the MAC CE may include more than one PUCCH resource ID and corresponding spatial relation/transmission info. UE may also be able to deduce N from the size field of the header of the MAC CE.

The number of repetitions, $N_{rep}$, associated with a PUCCH resource which has N>1 activated spatial relations using this embodiment may be given by N or separately configured. UCI transmission using the PUCCH resource is then repeated $N_{rep}$ times. In some embodiments, the $N_{rep}$ repetitions may be transmitted over $N_{rep}$ consecutive slots. In some other embodiments, the $N_{rep}$ repetitions may be transmitted over $N_{rep}$ consecutive sub-slots. In an alternative embodiment, the repetitions may be transmitted over $N_{rep}$ consecutive sets of symbols.

In the above embodiments, the order of the indicated spatial relation may have a meaning. In option 1, where bitmap is used, the order is taken into account in the RRC configured list for example such that x first elements of the list correspond to TRPa and/or r amount of UL symbols and y following elements correspond to TRPb and/or s amount of UL symbols. Then the Mac CE selects max n or n IDs from the first part of the list and max m or m IDs from the following parts of the list. In option2, it may be specified which TRPs or symbols or combination of those the ID in octet v is associated to.

Activating More Than One Spatial Relation for a Group of PUCCH Resources

In this embodiment, a MAC CE may be used to activate more than one spatial relation for a group of PUCCH resources. In one particular example, such a MAC CE may indicate at least the following:
1. a PUCCH Resource group ID representing the PUCCH resource(s) for which spatial relation is updated/indicated or a list of PUCCH resources/resource IDs representing such a PUCCH resource group; and
2. up to N>1 spatial relation IDs to indicate the N>1 activated spatial relations activated for the indicated group of PUCCH resources.
   a. If N is RRC configured or fixed in specification, the PUCCH resource ID is followed by N spatial relation, or UL TCI state, or UL transmission state IDs
   b. If N is not RRC configured or fixed in specification, the MAC CE may include a field C which gives the number of these IDs. This field is needed if the MAC CE may include more than one PUCCH resource ID and corresponding spatial relation/transmission info. UE may also be able to deduce N from the size field of the header of the MAC CE.

The number of repetitions, $N_{rep}$, associated with a PUCCH resource belonging to the PUCCH resource group which has N>1 activated spatial relations using this embodiment may be either given by N or separately configured. UCI transmission using the PUCCH resource is then repeated $N_{rep}$ times. In some embodiments, the $N_{rep}$ repetitions may be transmitted over $N_{rep}$ consecutive slots. In some other embodiments, the $N_{rep}$ repetitions may be transmitted over $N_{rep}$ consecutive sub-slots. In an alternative embodiment, the repetitions may be transmitted over $N_{rep}$ consecutive sets of symbols.

In the above embodiments, the order of the indicated spatial relation may have a meaning. In option 1, where bitmap is used, the order is taken into account in the RRC configured list for example such that x first elements of the list correspond to TRPa and/or r amount of UL symbols and y following elements correspond to TRPb and/or s amount of UL symbols. Then the MAC CE selects max n or n IDs from the first part of the list and max m or m IDs from the following parts of the list. In option2, it may be specified which TRPs or symbols or combination of those the ID in octet v is associated to.

In this embodiment, instead of PUCCH resource group ID a PUCCH resource set ID as specified in NR Release 15 can be applied.

Dynamically Indication of Spatial Relation(s) for a PUCCH Resource in DCI

In another embodiment, multiple sets of spatial relations may be activated by a MAC CE, each set may contain one or multiple spatial relations (can also be called one UL TCI state, or one UL transmission state) and may be mapped to a code point of a bit field in DCI scheduling PDSCH. The DCI can be used to indicate/select one set of spatial relations from the activated sets to use for a PUCCH transmission carrying HARQ A/N. Either reusing an existing DCI bit field or introducing a new DCI field for the purpose. In this case, spatial relation(s) for a PUCCH resource can be dynamically indicated in a slot by slot basis. Some sets may contain only a single spatial relation while others may contain more than one spatial relation. For eMBB traffic, sets with a single spatial relation may be indicated and in this case, the corresponding PUCCH may not be repeated. For URLLC traffic, sets with more than one spatial relation may be indicated and in this case, the corresponding PUCCH may be repeated.

Linking Spatial Relation(s) for a PUCCH Resource to DL TCI State(s) of a PDSCH

In another embodiment, the spatial relations used for a PUCCH transmission carrying HARQ A/N may be linked to the DL TCI states for the associated DL PDSCH transmission. For example, if two DL TCI states are indicated in the DCI scheduling a PDSCH, the PUCCH carrying the corresponding HARQ A/N may be sent based on the two TCI states, where the DL reference signals in the TCI states are assumed by the UE as the DL reference signals for the PUCCH transmission. Any DL reference signal(s) in previously activated spatial relations (or UL TCI state, or UL transmission state) by MAC CE for the PUCCH resource is overwritten by the DL TCI state(s).

In one embodiment, the PUCCH power control parameters contained in the activated spatial relations may be used. In another embodiment, the PUCCH power control parameters, including the pathloss reference signal, may be configured by RRC for each DL reference signal. When a DL reference signal is selected, the corresponding power control parameters are used for PUCCH transmission according to the DL reference signal.

Linking Spatial Relation(s) for a PUCCH Resource to DL TCI State(s) of CORESET(s) in a Search Space In another embodiment, the spatial relations used for a PUCCH transmission carrying HARQ A/N may be linked to the TCI state(s) of CORESET(s) associated with a search space set over which the associated DL PDCCH transmission is detected. If there are two CORESETs associated to the search space, then the PUCCH carrying HARQ Ack/Nack for a PDSCH scheduled by the PDCCH may be sent based on the two activated TCI states of two CORESETs, where the reference signals in the TCI states are assumed by the UE as the reference signals for the PUCCH transmission.

Figure 17:
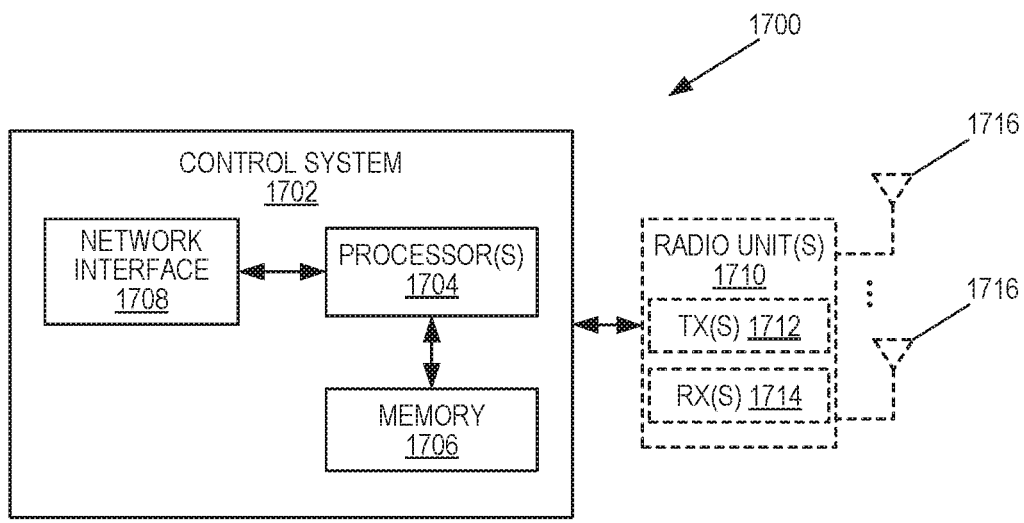
FIG. 17 is a schematic block diagram of a radio access node according to some embodiments of the present disclosure.

FIG. 17 is a schematic block diagram of a radio access node 1700 according to some embodiments of the present disclosure. Optional features are represented by dashed boxes. The radio access node 1700 may be, for example, a base station 1002 or 1006 or a network node that implements all or part of the functionality of the base station 1002 or gNB described herein. As illustrated, the radio access node 1700 includes a control system 1702 that includes one or more processors 1704 (e.g., Central Processing Units (CPUs), Application Specific Integrated Circuits (ASICs), Field Programmable Gate Arrays (FPGAs), and/or the like), memory 1706, and a network interface 1708. The one or more processors 1704 are also referred to herein as processing circuitry. In addition, the radio access node 1700 may include one or more radio units 1710 that each includes one or more transmitters 1712 and one or more receivers 1714 coupled to one or more antennas 1716. The radio units 1710 may be referred to or be part of radio interface circuitry. In some embodiments, the radio unit(s) 1710 is external to the control system 1702 and connected to the control system 1702 via, e.g., a wired connection (e.g., an optical cable). However, in some other embodiments, the radio unit(s) 1710 and potentially the antenna(s) 1716 are integrated together with the control system 1702. The one or more processors 1704 operate to provide one or more functions of a radio access node 1700 as described herein. In some embodiments, the function(s) are implemented in software that is stored, e.g., in the memory 1706 and executed by the one or more processors 1704.

Figure 18:
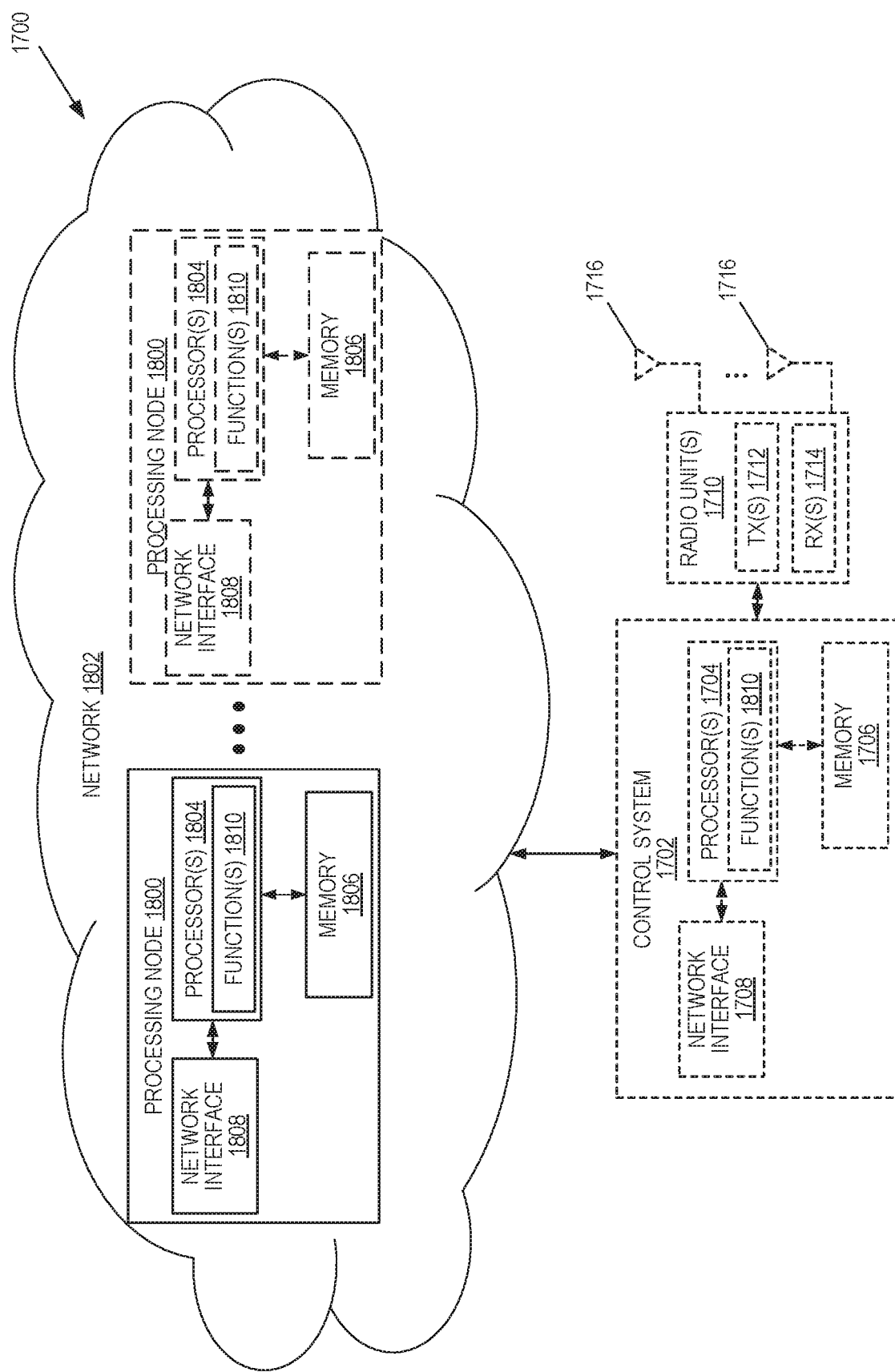
FIG. 18 is a schematic block diagram that illustrates a virtualized embodiment of the radio access node according to some embodiments of the present disclosure.

FIG. 18 is a schematic block diagram that illustrates a virtualized embodiment of the radio access node 1700 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1700 in which at least a portion of the functionality of the radio access node 1700 is implemented as a virtual component(s) (e.g., via a virtual machine(s) executing on a physical processing node(s) in a network(s)). As illustrated, in this example, the radio access node 1700 may include the control system 1702 and/or the one or more radio units 1710, as described above. The control system 1702 may be connected to the radio unit(s) 1710 via, for example, an optical cable or the like. The radio access node 1700 includes one or more processing nodes 1800 coupled to or included as part of a network(s) 1802. If present, the control system 1702 or the radio unit(s) are connected to the processing node(s) 1800 via the network 1802. Each processing node 1800 includes one or more processors 1804 (e.g., CPUs, ASICs, FPGAs, and/or the like), memory 1806, and a network interface 1808.

In this example, functions 1810 of the radio access node 1700 described herein are implemented at the one or more processing nodes 1800 or distributed across the one or more processing nodes 1800 and the control system 1702 and/or the radio unit(s) 1710 in any desired manner. In some particular embodiments, some or all of the functions 1810 of the radio access node 1700 described herein are implemented as virtual components executed by one or more virtual machines implemented in a virtual environment(s) hosted by the processing node(s) 1800. As will be appreciated by one of ordinary skill in the art, additional signaling or communication between the processing node(s) 1800 and the control system 1702 is used in order to carry out at least some of the desired functions 1810. Notably, in some embodiments, the control system 1702 may not be included, in which case the radio unit(s) 1710 communicate directly with the processing node(s) 1800 via an appropriate network interface(s).

In some embodiments, a computer program including instructions which, when executed by at least one processor, causes the at least one processor to carry out the functionality of radio access node 1700 or a node (e.g., a processing node 1800) implementing one or more of the functions 1810 of the radio access node 1700 in a virtual environment according to any of the embodiments described herein is provided.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
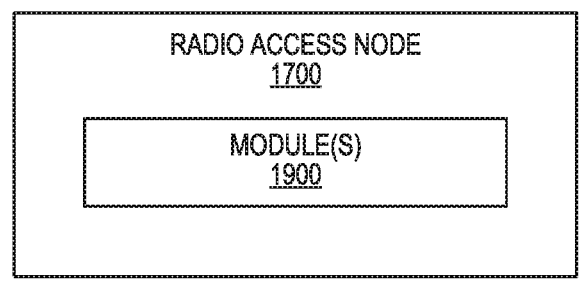
FIG. 19 is a schematic block diagram of the radio access node according to some other embodiments of the present disclosure.

FIG. 19 is a schematic block diagram of the radio access node 1700 according to some other embodiments of the present disclosure. The radio access node 1700 includes one or more modules 1900, each of which is implemented in software. The module(s) 1900 provide the functionality of the radio access node 1700 described herein. This discussion is equally applicable to the processing node 1800 of FIG. 18 where the modules 1900 may be implemented at one of the processing nodes 1800 or distributed across multiple processing nodes 1800 and/or distributed across the processing node(s) 1800 and the control system 1702.

Figure 20:
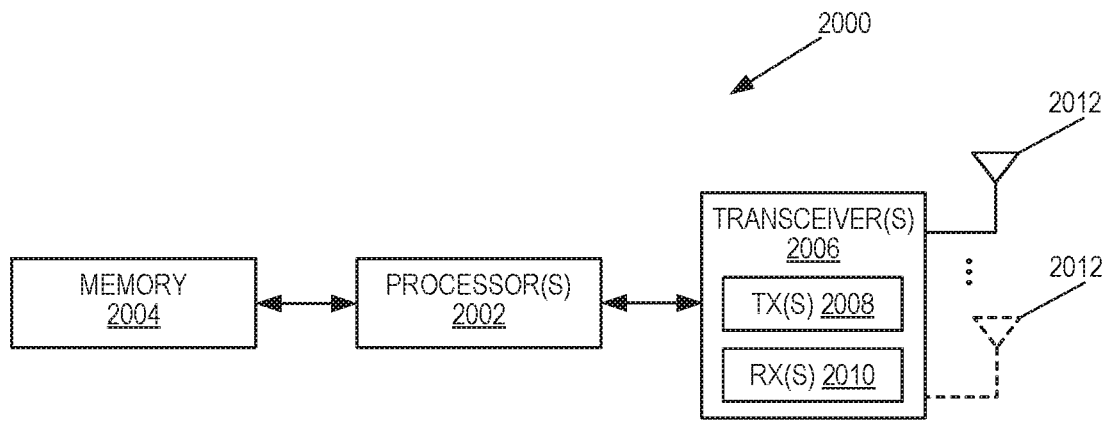
FIG. 20 is a schematic block diagram of a wireless communication device according to some embodiments of the present disclosure.

FIG. 20 is a schematic block diagram of a wireless communication device 2000 according to some embodiments of the present disclosure. As illustrated, the wireless communication device 2000 includes one or more processors 2002 (e.g., CPUs, ASICs, FPGAs, and/or the like), memory 2004, and one or more transceivers 2006 each including one or more transmitters 2008 and one or more receivers 2010 coupled to one or more antennas 2012. The transceiver(s) 2006 includes radio-front end circuitry connected to the antenna(s) 2012 that is configured to condition signals communicated between the antenna(s) 2012 and the processor(s) 2002, as will be appreciated by on of ordinary skill in the art. The processors 2002 are also referred to herein as processing circuitry. The transceivers 2006 are also referred to herein as radio circuitry. In some embodiments, the functionality of the wireless communication device 2000 described above may be fully or partially implemented in software that is, e.g., stored in the memory 2004 and executed by the processor(s) 2002. Note that the wireless communication device 2000 may include additional components not illustrated in FIG. 20 such as, e.g., one or more user interface components (e.g., an input/output interface including a display, buttons, a touch screen, a microphone, a speaker(s), and/or the like and/or any other components for allowing input of information into the wireless communication device 2000 and/or allowing output of information from the wireless communication device 2000), a power supply (e.g., a battery and associated power circuitry), etc.

In some embodiments, a computer program including instructions which, when executed by at least one processor, causes the at least one processor to carry out the functionality of the wireless communication device 2000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
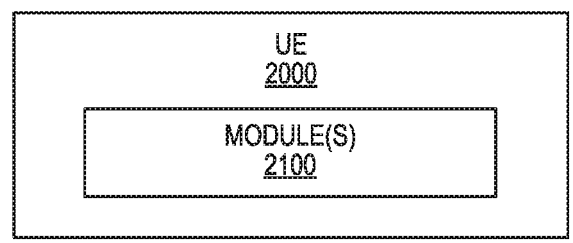
FIG. 21 is a schematic block diagram of the wireless communication device according to some other embodiments of the present disclosure.

FIG. 21 is a schematic block diagram of the wireless communication device 2000 according to some other embodiments of the present disclosure. The wireless communication device 2000 includes one or more modules 2100, each of which is implemented in software. The module(s) 2100 provide the functionality of the wireless communication device 2000 described herein.

Figure 22:
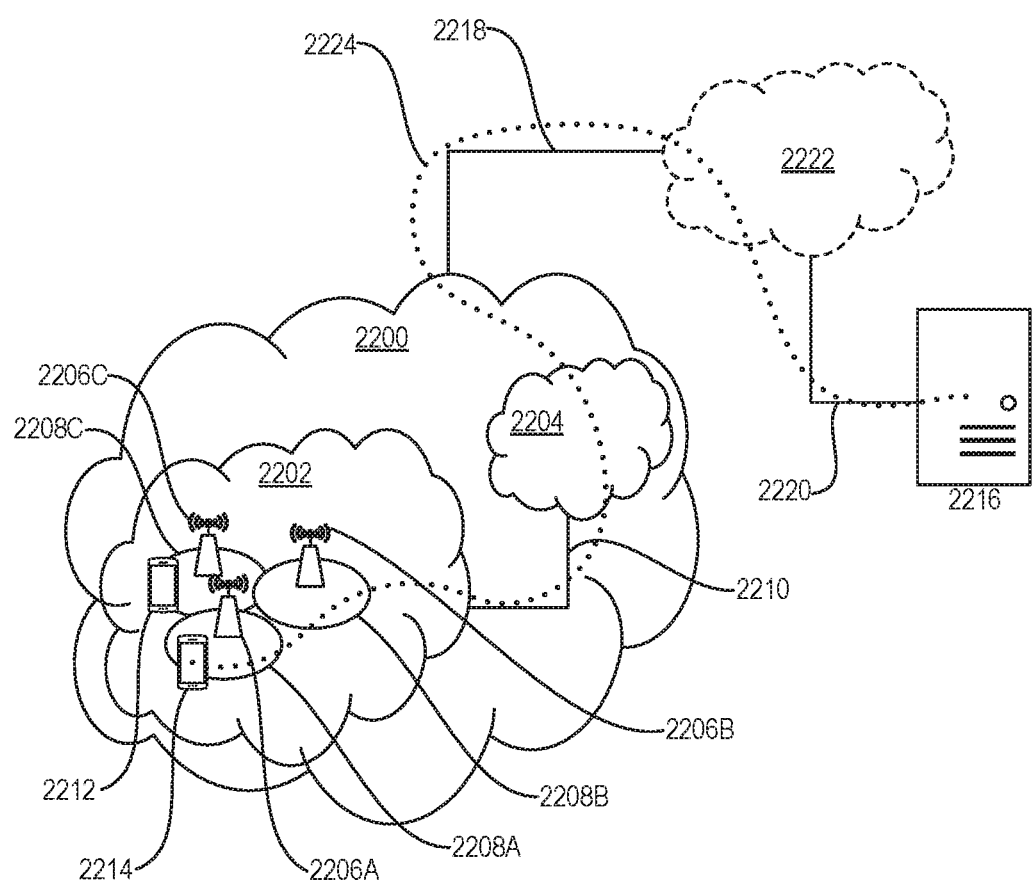
FIGS. 22 and 23 illustrate a communication system includes a telecommunication network according to some other embodiments of the present disclosure.

With reference to FIG. 22, in accordance with an embodiment, a communication system includes a telecommunication network 2200, such as a 3GPP-type cellular network, which comprises an access network 2202, such as a RAN, and a core network 2204. The access network 2202 comprises a plurality of base stations 2206A, 2206B, 2206C, such as Node Bs, eNBs, gNBs, or other types of wireless Access Points (APs), each defining a corresponding coverage area 2208A, 2208B, 2208C. Each base station 2206A, 2206B, 2206C is connectable to the core network 2204 over a wired or wireless connection 2210. A first UE 2212 located in coverage area 2208C is configured to wirelessly connect to, or be paged by, the corresponding base station 2206C. A second UE 2214 in coverage area 2208A is wirelessly connectable to the corresponding base station 2206A. While a plurality of UEs 2212, 2214 are illustrated in this example, the disclosed embodiments are equally applicable to a situation where a sole UE is in the coverage area or where a sole UE is connecting to the corresponding base station 2206.

The telecommunication network 2200 is itself connected to a host computer 2216, which may be embodied in the hardware and/or software of a standalone server, a cloud-implemented server, a distributed server, or as processing resources in a server farm. The host computer 2216 may be under the ownership or control of a service provider, or may be operated by the service provider or on behalf of the service provider. Connections 2218 and 2220 between the telecommunication network 2200 and the host computer 2216 may extend directly from the core network 2204 to the host computer 2216 or may go via an optional intermediate network 2222. The intermediate network 2222 may be one of, or a combination of more than one of, a public, private, or hosted network; the intermediate network 2222, if any, may be a backbone network or the Internet; in particular, the intermediate network 2222 may comprise two or more sub-networks (not shown).

The communication system of FIG. 22 as a whole enables connectivity between the connected UEs 2212, 2214 and the host computer 2216. The connectivity may be described as an Over-the-Top (OTT) connection 2224. The host computer 2216 and the connected UEs 2212, 2214 are configured to communicate data and/or signaling via the OTT connection 2224, using the access network 2202, the core network 2204, any intermediate network 2222, and possible further infrastructure (not shown) as intermediaries. The OTT connection 2224 may be transparent in the sense that the participating communication devices through which the OTT connection 2224 passes are unaware of routing of uplink and downlink communications. For example, the base station 2206 may not or need not be informed about the past routing of an incoming downlink communication with data originating from the host computer 2216 to be forwarded (e.g., handed over) to a connected UE 2212. Similarly, the base station 2206 need not be aware of the future routing of an outgoing uplink communication originating from the UE 2212 towards the host computer 2216.

Example implementations, in accordance with an embodiment, of the UE, base station, and host computer discussed in the preceding paragraphs will now be described with reference to FIG. 23. In a communication system 2300, a host computer 2302 comprises hardware 2304 including a communication interface 2306 configured to set up and maintain a wired or wireless connection with an interface of a different communication device of the communication system 2300. The host computer 2302 further comprises processing circuitry 2308, which may have storage and/or processing capabilities. In particular, the processing circuitry 2308 may comprise one or more programmable processors, ASICs, FPGAs, or combinations of these (not shown) adapted to execute instructions. The host computer 2302 further comprises software 2310, which is stored in or accessible by the host computer 2302 and executable by the processing circuitry 2308. The software 2310 includes a host application 2312. The host application 2312 may be operable to provide a service to a remote user, such as a UE 2314 connecting via an OTT connection 2316 terminating at the UE 2314 and the host computer 2302. In providing the service to the remote user, the host application 2312 may provide user data which is transmitted using the OTT connection 2316.

The communication system 2300 further includes a base station 2318 provided in a telecommunication system and comprising hardware 2320 enabling it to communicate with the host computer 2302 and with the UE 2314. The hardware 2320 may include a communication interface 2322 for setting up and maintaining a wired or wireless connection with an interface of a different communication device of the communication system 2300, as well as a radio interface 2324 for setting up and maintaining at least a wireless connection 2326 with the UE 2314 located in a coverage area (not shown in FIG. 23) served by the base station 2318. The communication interface 2322 may be configured to facilitate a connection 2328 to the host computer 2302. The connection 2328 may be direct or it may pass through a core network (not shown in FIG. 23) of the telecommunication system and/or through one or more intermediate networks outside the telecommunication system. In the embodiment shown, the hardware 2320 of the base station 2318 further includes processing circuitry 2330, which may comprise one or more programmable processors, ASICs, FPGAs, or combinations of these (not shown) adapted to execute instructions. The base station 2318 further has software 2332 stored internally or accessible via an external connection.

The communication system 2300 further includes the UE 2314 already referred to. The UE's 2314 hardware 2334 may include a radio interface 2336 configured to set up and maintain a wireless connection 2326 with a base station serving a coverage area in which the UE 2314 is currently located. The hardware 2334 of the UE 2314 further includes processing circuitry 2338, which may comprise one or more programmable processors, ASICs, FPGAs, or combinations of these (not shown) adapted to execute instructions. The UE 2314 further comprises software 2340, which is stored in or accessible by the UE 2314 and executable by the processing circuitry 2338. The software 2340 includes a client application 2342. The client application 2342 may be operable to provide a service to a human or non-human user via the UE 2314, with the support of the host computer 2302. In the host computer 2302, the executing host application 2312 may communicate with the executing client application 2342 via the OTT connection 2316 terminating at the UE 2314 and the host computer 2302. In providing the service to the user, the client application 2342 may receive request data from the host application 2312 and provide user data in response to the request data. The OTT connection 2316 may transfer both the request data and the user data. The client application 2342 may interact with the user to generate the user data that it provides.

Figure 23:
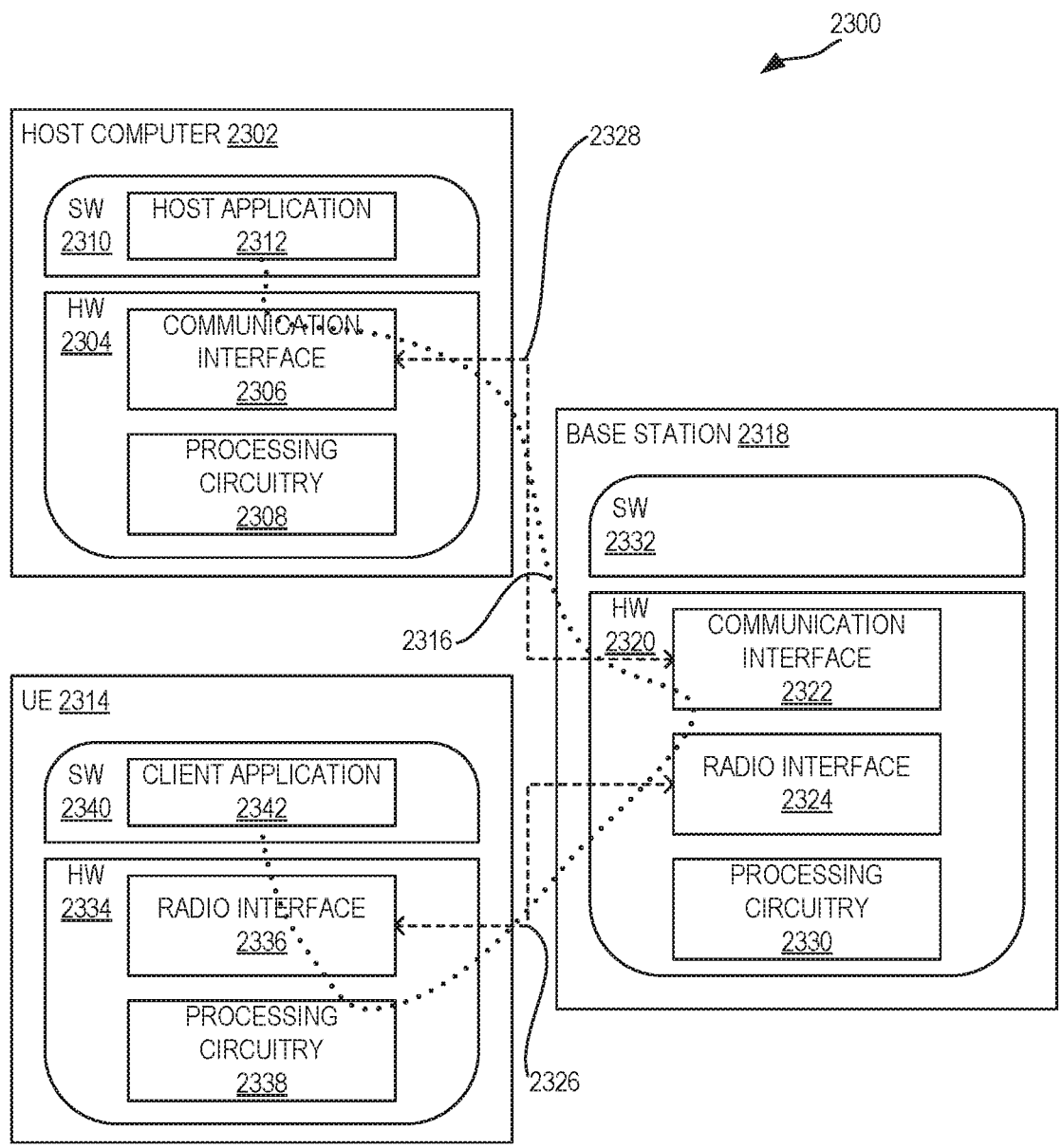

It is noted that the host computer 2302, the base station 2318, and the UE 2314 illustrated in FIG. 23 may be similar or identical to the host computer 2216, one of the base stations 2206A, 2206B, 2206C, and one of the UEs 2212, 2214 of FIG. 22, respectively. This is to say, the inner workings of these entities may be as shown in FIG. 23 and independently, the surrounding network topology may be that of FIG. 22.

In FIG. 23, the OTT connection 2316 has been drawn abstractly to illustrate the communication between the host computer 2302 and the UE 2314 via the base station 2318 without explicit reference to any intermediary devices and the precise routing of messages via these devices. The network infrastructure may determine the routing, which may be configured to hide from the UE 2314 or from the service provider operating the host computer 2302, or both. While the OTT connection 2316 is active, the network infrastructure may further take decisions by which it dynamically changes the routing (e.g., on the basis of load balancing consideration or reconfiguration of the network).

The wireless connection 2326 between the UE 2314 and the base station 2318 is in accordance with the teachings of the embodiments described throughout this disclosure. One or more of the various embodiments improve the performance of OTT services provided to the UE 2314 using the OTT connection 2316, in which the wireless connection 2326 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2316 between the host computer 2302 and the UE 2314, in response to variations in the measurement results. The measurement procedure and/or the network functionality for reconfiguring the OTT connection 2316 may be implemented in the software 2310 and the hardware 2304 of the host computer 2302 or in the software 2340 and the hardware 2334 of the UE 2314, or both. In some embodiments, sensors (not shown) may be deployed in or in association with communication devices through which the OTT connection 2316 passes; the sensors may participate in the measurement procedure by supplying values of the monitored quantities exemplified above, or supplying values of other physical quantities from which the software 2310, 2340 may compute or estimate the monitored quantities. The reconfiguring of the OTT connection 2316 may include message format, retransmission settings, preferred routing, etc.; the reconfiguring need not affect the base station 2318, and it may be unknown or imperceptible to the base station 2318. Such procedures and functionalities may be known and practiced in the art. In certain embodiments, measurements may involve proprietary UE signaling facilitating the host computer 2302's measurements of throughput, propagation times, latency, and the like. The measurements may be implemented in that the software 2310 and 2340 causes messages to be transmitted, in particular empty or 'dummy' messages, using the OTT connection 2316 while it monitors propagation times, errors, etc.

Figure 24:
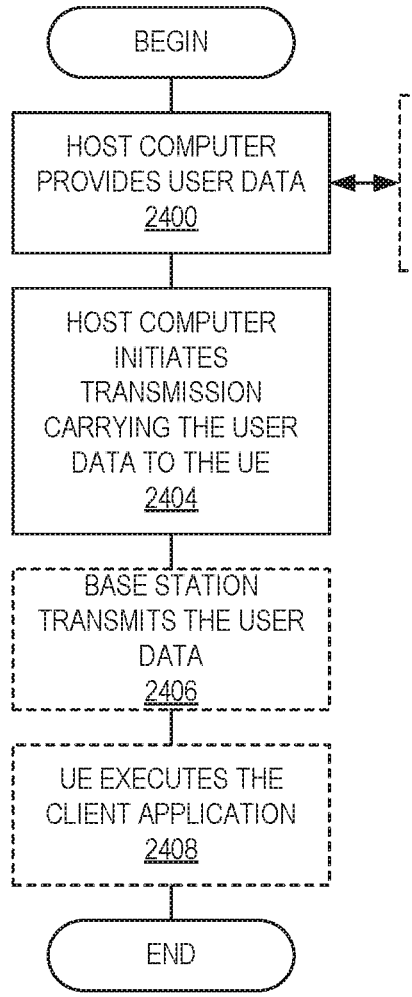
FIGS. 24-27 are flowcharts illustrating a method implemented in a communication system according to some other embodiments of the present disclosure.

FIG. 24 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 24 will be included in this section. In step 2400, the host computer provides user data. In sub-step 2402 (which may be optional) of step 2400, the host computer provides the user data by executing a host application. In step 2404, the host computer initiates a transmission carrying the user data to the UE. In step 2406 (which may be optional), the base station transmits to the UE the user data which was carried in the transmission that the host computer initiated, in accordance with the teachings of the embodiments described throughout this disclosure. In step 2408 (which may also be optional), the UE executes a client application associated with the host application executed by the host computer.

Figure 25:
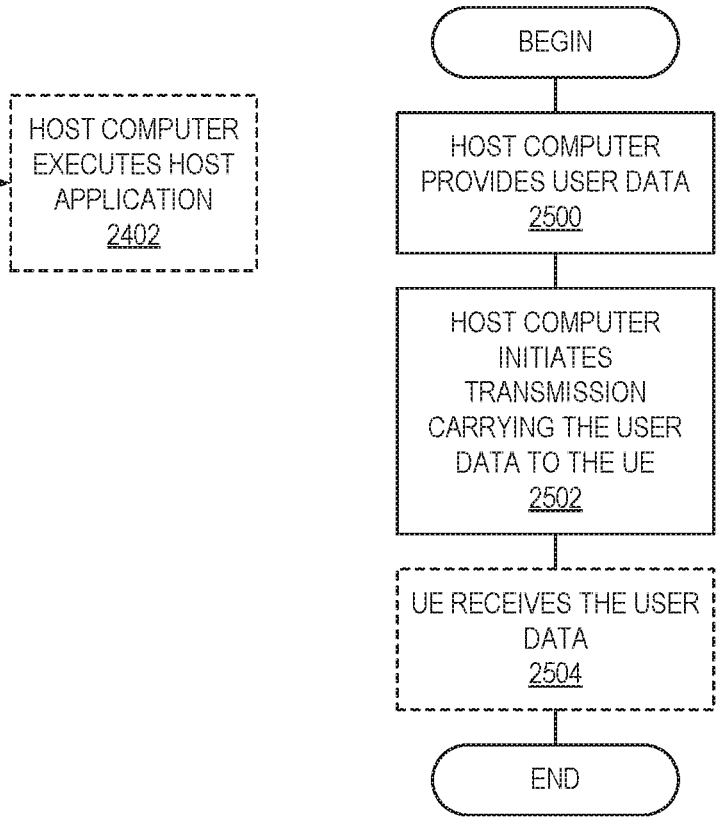

FIG. 25 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 25 will be included in this section. In step 2500 of the method, the host computer provides user data. In an optional sub-step (not shown) the host computer provides the user data by executing a host application. In step 2502, the host computer initiates a transmission carrying the user data to the UE. The transmission may pass via the base station, in accordance with the teachings of the embodiments described throughout this disclosure. In step 2504 (which may be optional), the UE receives the user data carried in the transmission.

Figures 26, 27:
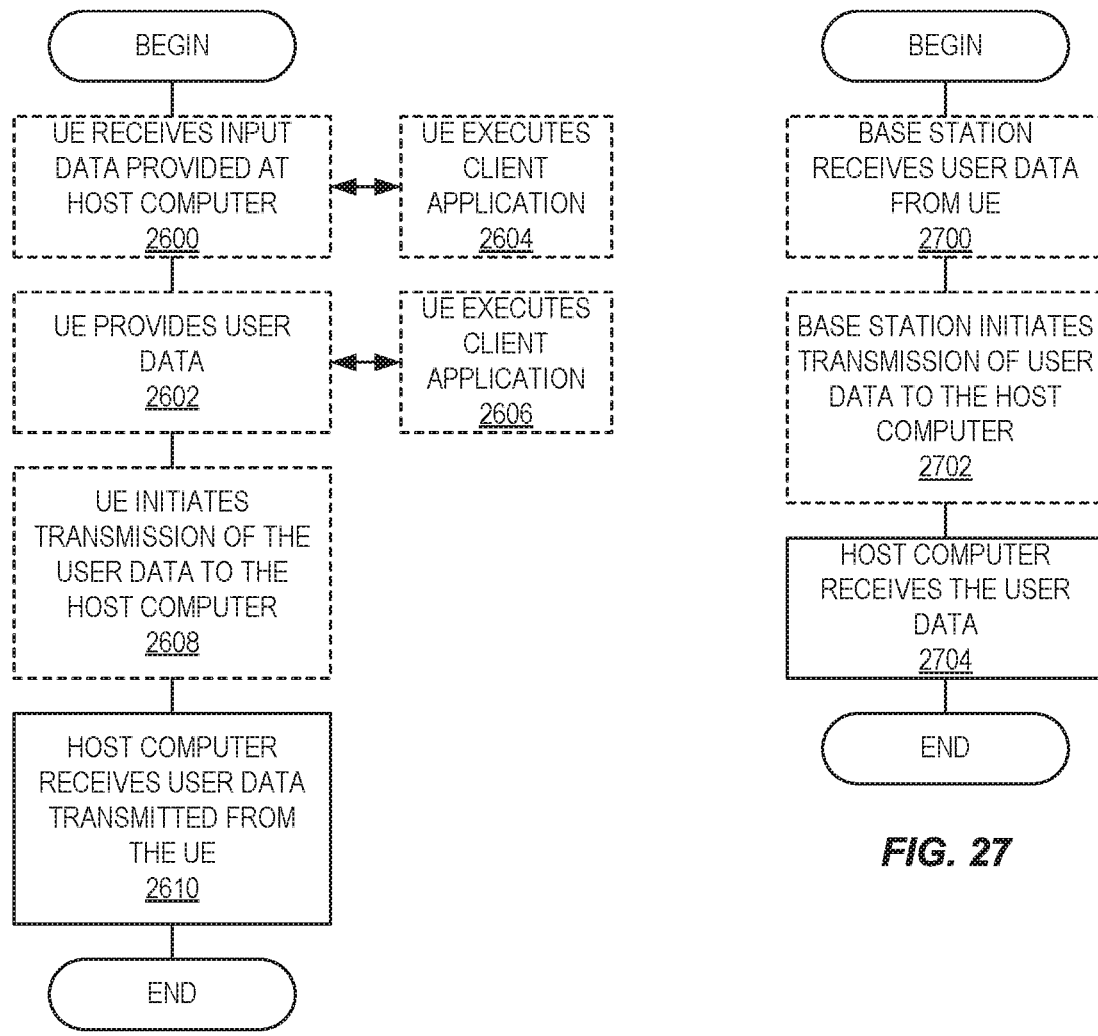

FIG. 26 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 26 will be included in this section. In step 2600 (which may be optional), the UE receives input data provided by the host computer. Additionally or alternatively, in step 2602, the UE provides user data. In sub-step 2604 (which may be optional) of step 2600, the UE provides the user data by executing a client application. In sub-step 2606 (which may be optional) of step 2602, the UE executes a client application which provides the user data in reaction to the received input data provided by the host computer. In providing the user data, the executed client application may further consider user input received from the user. Regardless of the specific manner in which the user data was provided, the UE initiates, in sub-step 2608 (which may be optional), transmission of the user data to the host computer. In step 2610 of the method, the host computer receives the user data transmitted from the UE, in accordance with the teachings of the embodiments described throughout this disclosure.

FIG. 27 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 27 will be included in this section. In step 2700 (which may be optional), in accordance with the teachings of the embodiments described throughout this disclosure, the base station receives user data from the UE. In step 2702 (which may be optional), the base station initiates transmission of the received user data to the host computer. In step 2704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for transmitting Uplink Control Information, UCI, the method comprising at least one of: receiving (1104) an activation command to activate a first spatial relation and a second spatial relation out of a plurality of spatial relations; determining (1106) the first spatial relation and the second spatial relation based on one or more DL TCI states; transmitting (1108) the UCI according to the first spatial relation in a first set of symbols or slots; and transmitting (1110) the UCI according to the second spatial relation in a second set of symbols or slots.

Embodiment 2: The method of embodiment 1 wherein the plurality of spatial relations are for a Physical Uplink Control Channel, PUCCH, resource.

Embodiment 3: The method of any of embodiments 1 to 2 wherein each spatial relation contains at least a Downlink, DL, reference signal.

Embodiment 4: The method of any of embodiments 1 to 3 wherein the UCI in the second set of symbols is a repetition of the UCI in the first set of symbols within a same slot.

Embodiment 5: The method of embodiment 4 wherein a time and frequency resource in the first set of symbols is specified by the PUCCH resource.

Embodiment 6: The method of any of embodiments 1 to 5 wherein the UCI is carried with short PUCCH format 0 or Embodiment 2:

Embodiment 7: The method of any of embodiments 1 to 6 wherein the UCI transmitted in the second set of slots is a repetition of the UCI transmitted in the first set of slots, wherein a time and frequency resource in each slot for the UCI is specified by the PUCCH resource.

Embodiment 8: The method of any of embodiments 1 to 7 further comprising: signaling (1102) a total number of slots for one or more of the first and the second set of slots.

Embodiment 9: The method of any of embodiments 1 to 8 wherein the transmitting UCI according to the first spatial relation in a first set of symbols or slots and according to the second spatial relation in a second set of symbols or slots is done when a condition is met.

Embodiment 10: The method of any of embodiment 9 wherein the condition comprises one or more of: more than one Transmission Configuration Indicator, TCI, state is indicated in a DCI scheduling a Physical Downlink Shared Channel, PDSCH, for which a Hybrid Automatic Repeat Request, HARQ Acknowledgement/Negative Acknowledgement, A/N, is to be transmitted in the PUCCH resource; a high priority is indicated in a Downlink Control Information, DCI, scheduling a PDSCH for which a HARQ A/N is to be transmitted in the PUCCH resource; and a UCI associated with a certain traffic type.

Embodiment 11: The method of any of embodiments 1 to 10 wherein the activation command is carried by a Medium Access Control, MAC, Control Element, CE.

Embodiment 12: The method of embodiment 11 wherein the MAC CE activates the first and second spatial relation for more than one PUCCH resource.

Embodiment 13: The method of any of embodiments 1 to 12 further comprising: receiving (1100) the plurality of spatial relations.

Embodiment 14: The method of embodiment 13 wherein receiving the plurality of spatial relations comprises receiving a Radio Resource Control, RRC, configuration of the plurality of spatial relations.

Embodiment 15: The method of any of embodiments 1 to 10 wherein the activation command activates an Uplink, UL, TCI state out of a plurality of UL TCI states for a PUCCH resource.

Embodiment 16: The method of embodiment 15 wherein the UL TCI state contains a first and a second DL reference signal.

Embodiment 17: The method of any of embodiments 1 to 16 wherein transmitting the UCI according to the first spatial relation or the second spatial relation comprises transmitting the UCI according to the first DL reference signal in the first set of symbols or slots and according to the second DL reference signal in the second set of symbols or slots.

Embodiment 18: The method of any of embodiments 1 to 17 wherein the one or more DL TCI states are one or more of: DL TCI states indicated in a DCI scheduling a PDSCH for which a HARQ A/N is to be carried on the PUCCH resource; and DL TCI states of one or more Control Resource Sets, CORESETs, over which a DCI scheduling a PDSCH is detected and for which a HARQ A/N is to be carried on the PUCCH resource.

Embodiment 19: The method of any of embodiments 1 to 10 wherein the wireless device operates in a New Radio, NR, communications network.

Embodiment 20: The method of any of the previous embodiments, further comprising: providing user data; and forwarding the user data to a host computer via the transmission to the base station.

Group B Embodiments

Embodiment 21: A method performed by a base station for receiving Uplink Control Information, UCI, the method comprising at least one of: transmitting (1204) an activation command to activate a first spatial relation and a second spatial relation out of a plurality of spatial relations; indicating (1206) the first spatial relation and the second spatial relation based on one or more DL TCI states; receiving (1208) the UCI according to the first spatial relation in a first set of symbols or slots; and receiving (1210) the UCI according to the second spatial relation in a second set of symbols or slots.

Embodiment 22: The method of embodiment 21 wherein the plurality of spatial relations are for a Physical Uplink Control Channel, PUCCH, resource.

Embodiment 23: The method of any of embodiments 21 to 22 wherein each spatial relation contains at least a Downlink, DL, reference signal.

Embodiment 24: The method of any of embodiments 21 to 23 wherein the UCI in the second set of symbols is a repetition of the UCI in the first set of symbols within a same slot.

Embodiment 25: The method of embodiment 24 wherein a time and frequency resource in the first set of symbols is specified by the PUCCH resource.

Embodiment 26: The method of any of embodiments 21 to 25 wherein the UCI is carried with short PUCCH format 0 or Embodiment 2:

Embodiment 27: The method of any of embodiments 21 to 26 wherein the UCI received in the second set of slots is a repetition of the UCI received in the first set of slots, wherein a time and frequency resource in each slot for the UCI is specified by the PUCCH resource.

Embodiment 28: The method of any of embodiments 21 to 27 further comprising: signaling (1202) a total number of slots for one or more of the first and the second set of slots.

Embodiment 29: The method of any of embodiments 21 to 28 wherein the receiving UCI according to the first spatial relation in a first set of symbols or slots and according to the second spatial relation in a second set of symbols or slots is done when a condition is met.

Embodiment 30: The method of any of embodiment 29 wherein the condition comprises one or more of: more than one Transmission Configuration Indicator, TCI, state is indicated in a DCI scheduling a Physical Downlink Shared Channel, PDSCH, for which a Hybrid Automatic Repeat Request, HARQ Acknowledgement/Negative Acknowledgement, A/N, is to be transmitted in the PUCCH resource; a high priority is indicated in a Downlink Control Information, DCI, scheduling a PDSCH for which a HARQ A/N is to be transmitted in the PUCCH resource; and a UCI associated with a certain traffic type.

Embodiment 31: The method of any of embodiments 2 to 30 wherein the activation command is carried by a Medium Access Control, MAC, Control Element, CE Embodiment 32: The method of embodiment 31 wherein the MAC CE activates the first and second spatial relation for more than one PUCCH resource.

Embodiment 33: The method of any of embodiments 21 to 32 further comprising: signaling (1200) the plurality of spatial relations.

Embodiment 34: The method of embodiment 33 wherein signalling the plurality of spatial relations comprises signaling a Radio Resource Control, RRC, configuration of the plurality of spatial relations.

Embodiment 35: The method of any of embodiments 21 to 30 wherein the activation command activates an Uplink, UL, TCI state out of a plurality of UL TCI states for a PUCCH resource.

Embodiment 36: The method of embodiment 35 wherein the UL TCI state contains a first and a second DL reference signal.

Embodiment 37: The method of any of embodiments 21 to 36 wherein receiving the UCI according to the first spatial relation or the second spatial relation comprises receiving the UCI according to the first DL reference signal in the first set of symbols or slots and according to the second DL reference signal in the second set of symbols or slots.

Embodiment 38: The method of any of embodiments 21 to 37 wherein the one or more DL TCI states are one or more of: DL TCI states indicated in a DCI scheduling a PDSCH for which a HARQ A/N is to be carried on the PUCCH resource; and DL TCI states of one or more Control Resource Sets, CORESETs, over which a DCI scheduling a PDSCH is detected and for which a HARQ A/N is to be carried on the PUCCH resource.

Embodiment 39: The method of any of embodiments 21 to 39 wherein the base station operates in a New Radio, NR, communications network.

Embodiment 40: The method of any of the previous embodiments, further comprising: obtaining user data; and forwarding the user data to a host computer or a wireless device.

Group C Embodiments

Embodiment 41: A wireless device for transmitting Uplink Control Information, UCI, the wireless device comprising: processing circuitry configured to perform any of the steps of any of the Group A embodiments; and power supply circuitry configured to supply power to the wireless device.

Embodiment 42: A base station for receiving Uplink Control Information, UCI, the base station comprising: processing circuitry configured to perform any of the steps of any of the Group B embodiments; and power supply circuitry configured to supply power to the base station.

Embodiment 43: A User Equipment, UE, for transmitting Uplink Control Information, UCI, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 44: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 45: The communication system of the previous embodiment further including the base station.

Embodiment 46: The communication system of the previous 2 embodiments, further including the UE, wherein the UE is configured to communicate with the base station.

Embodiment 47: The communication system of the previous 3 embodiments, wherein: the processing circuitry of the host computer is configured to execute a host application, thereby providing the user data; and the UE comprises processing circuitry configured to execute a client application associated with the host application.

Embodiment 48: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 49: The method of the previous embodiment, further comprising, at the base station, transmitting the user data.

Embodiment 50: The method of the previous 2 embodiments, wherein the user data is provided at the host computer by executing a host application, the method further comprising, at the UE, executing a client application associated with the host application.

Embodiment 51: A User Equipment, UE, configured to communicate with a base station, the UE comprising a radio interface and processing circuitry configured to perform the method of the previous 3 embodiments.

Embodiment 52: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 53: The communication system of the previous embodiment, wherein the cellular network further includes a base station configured to communicate with the UE.

Embodiment 54: The communication system of the previous 2 embodiments, wherein: the processing circuitry of the host computer is configured to execute a host application, thereby providing the user data; and the UE's processing circuitry is configured to execute a client application associated with the host application.

Embodiment 55: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 56: The method of the previous embodiment, further comprising at the UE, receiving the user data from the base station.

Embodiment 57: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 58: The communication system of the previous embodiment, further including the UE.

Embodiment 59: The communication system of the previous 2 embodiments, further including the base station, wherein the base station comprises a radio interface configured to communicate with the UE and a communication interface configured to forward to the host computer the user data carried by a transmission from the UE to the base station.

Embodiment 60: The communication system of the previous 3 embodiments, wherein: the processing circuitry of the host computer is configured to execute a host application; and the UE's processing circuitry is configured to execute a client application associated with the host application, thereby providing the user data.

Embodiment 61: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 62: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 63: The method of the previous embodiment, further comprising, at the UE, providing the user data to the base station.

Embodiment 64: The method of the previous 2 embodiments, further comprising: at the UE, executing a client application, thereby providing the user data to be transmitted; and at the host computer, executing a host application associated with the client application.

Embodiment 65: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 66: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 67: The communication system of the previous embodiment further including the base station.

Embodiment 68: The communication system of the previous 2 embodiments, further including the UE, wherein the UE is configured to communicate with the base station.

Embodiment 69: The communication system of the previous 3 embodiments, wherein: the processing circuitry of the host computer is configured to execute a host application; and the UE is configured to execute a client application associated with the host application, thereby providing the user data to be received by the host computer.

Embodiment 70: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 71: The method of the previous embodiment, further comprising at the base station, receiving the user data from the UE.

Embodiment 72: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
A/N Acknowledgement/Negative Acknowledgement
ACK Acknowledgement
AMF Access and Mobility Function
AP Access Point
ARI ACK/NACK Resource Indicator
ASIC Application Specific Integrated Circuit
AUSF Authentication Server Function
BWP Bandwidth Part
CA Carrier Aggregation
CBG Code Block Group
CCE Control Channel Element
CE Control Element
CORESET Control Resource Set
CP-OFDM Cyclic Prefix Orthogonal Frequency Division Multiplexing
CPU Central Processing Unit
CRC Cyclic Redundancy Check
CSI Channel State Information
CSI-RS Channel State Information Reference Signal
CW Codeword
DCI Downlink Channel Information
DFT Discrete Fourier Transform
DL Downlink
DMRS Demodulation Reference Signal
DSP Digital Signal Processor
eNB Enhanced or Evolved Node B
EPS Evolved Packet System
E-UTRA Evolved Universal Terrestrial Radio Access
FH Frequency Hopping
FPGA Field Programmable Gate Array
FR Frequency Range
gNB New Radio Base Station
gNB-CU New Radio Base Station Central Unit
gNB-DU New Radio Base Station Distributed Unit
HARQ Hybrid Automatic Repeat Request
HSS Home Subscriber Server
IoT Internet of Things
LTE Long Term Evolution
MAC Medium Access Control
MIMO Multiple Input Multiple Output
MME Mobility Management Entity
MTC Machine Type Communication
NEF Network Exposure Function
NF Network Function
NR New Radio
NRF Network Function Repository Function
NSSF Network Slice Selection Function
NZP Non-Zero Power
OCC Orthogonal Cover Code
OTT Over-the-Top
PC Personal Computer
PCF Policy Control Function
PDCCH Physical Downlink Control Channel
PDSCH Physical Downlink Shared Channel
P-GW Packet Data Network Gateway
PRI PUCCH Resource Indicator
PUCCH Physical Uplink Control Channels
PUSCH Physical Uplink Shared Channel
QCL Quasi Co-Located
RAM Random Access Memory
RAN Radio Access Network
RB Resource Block
RE Resource Element
ROM Read Only Memory
RRC Radio Resource Control
RRH Remote Radio Head
RS Reference Signal SCEF Service Capability Exposure Function
SMF Session Management Function
SR Scheduling Request
SRS Sounding Reference Signal
SSB Synchronization Signal Block
TB Transport Block
TCI Transmission Configuration Indicator
TRP Transmission Reception Point
UCI Uplink Control Information
UDM Unified Data Management
UE User Equipment
UL Uplink
UPF User Plane Function
URLLC Ultra-Reliable Low Latency Communication Those skilled in the art will recognize improvements and modifications to the embodiments of the present disclosure. All such improvements and modifications are considered within the scope of the concepts disclosed herein.

The invention claimed is:

1. A method performed by a wireless device for transmitting Uplink Control Information, UCI, the method comprising:
receiving an activation command to activate a first spatial relation and a second spatial relation out of a plurality of spatial relations;
transmitting the UCI according to the first spatial relation in a first set of symbols or slots; and
transmitting the UCI according to the second spatial relation in a second set of symbols or slots;
wherein the UCI in the second set of symbols is a repetition of the UCI in the first set of symbols within a same slot.

2. The method of claim 1, wherein the first spatial relation is provided by a first Uplink, UL, Transmission Configuration Indicator, TCI, state, the second spatial relation is provided by a second UL TCI state, and the plurality of spatial relations are provided by a plurality of UL TCI states.

3. The method of claim 1 wherein the plurality of spatial relations are for a Physical Uplink Control Channel, PUCCH, resource, optionally comprising a starting symbol and a number of symbols in time domain, and a starting resource block, RB, and a number of RBs in frequency domain.

4. The method of claim 1, wherein the UCI is carried in the PUCCH resource.

5. The method of claim 1, wherein each spatial relation contains one or more of a Downlink, DL, reference signal, a DL pathloss reference signal, and power control parameters including p0-PUCCH and closed-loop index.

6. The method of claim 1, wherein the first and the second set of symbols are symbols configured for the PUCCH resource.

7. The method of claim 1, wherein the first and the second sets of symbols start at different RBs when frequency hopping is enabled for the PUCCH resource.

8. The method of claim 1, wherein the UCI in the second set of symbols is a repetition of the UCI in the first set of symbols within a same slot.

9. The method of claim 8, wherein a time and frequency resource in the first set of symbols is specified by the PUCCH resource, and, optionally, the second set of symbols is a repetition of the first set of symbols within a same slot.

10. The method of claim 8, wherein the first and the second sets of symbols are in a first and a second sub-slot, respectively, within a slot.

11. The method of claim 8, wherein a time gap given by a number of symbols is configured between the end of the first set of symbols and the start of the second set of symbols.

12. The method of claim 11, wherein the time gap given by zero symbols is assumed if the time gap is not configured.

13. The method of claim 1, wherein a number of repetitions is either explicitly or implicitly indicated.

14. The method of claim 13, wherein the number of repetitions are semi-statically configured or dynamically selected via MAC CE.

15. The method of claim 1, wherein the UCI transmitted in the second set of slots is a repetition of the UCI transmitted in the first set of slots.

16. The method of claim 15, wherein a time and frequency resource in each slot for the UCI is specified by the PUCCH resource.

17. The method of claim 1, wherein the PUCCH resource is associated with one of PUCCH format 0, PUCCH format 1, PUCCH format 2, PUCCH format 3, and PUCCH format 4.

18. The method of claim 1, further comprising:
signaling a total number of slots for one or more of the first and the second set of slots.

19. The method of claim 1, wherein the first and the second sets of slots are interleaved with a interleave depth of D, wherein for a total of N slots with slot indices {n+1, . . . , n+N}, the first set of slots comprises slots with slot indices {n+mD+1, . . . n+(m+1) D; m=0, 2, . . . , 2M} while the second slots comprises slots with slot indices {n+mD+1, . . . n+(m+1)D; m=1, 3, . . . , 2M−1}, wherein $$M = \left\lfloor \left\lfloor \frac{N}{D} \right\rfloor / 2 \right\rfloor$$

and D is a positive integer.

20. The method of claim 1, wherein the method further comprises receiving a downlink control information, DCI, for scheduling a physical downlink shared channel, PDSCH.

21. The method of claim 1, wherein the UCI comprises a Hybrid Automatic Repeat Request Acknowledgement, HARQ Ack, associated with the PDSCH.

22. The method of claim 1, wherein the PUCCH resource is indicated in the DCI.

23. The method of claim 1, wherein the activation command is carried by a Medium Access Control, MAC, Control Element, CE.

24. The method of claim 23, wherein the MAC CE activates the first and second spatial relation for one PUCCH resource.

25. The method of claim 23, wherein the MAC CE activates the first and second spatial relation for one group of PUCCH resources consisting of more than one PUCCH resources.

26. The method of claim 1, further comprising:
receiving the plurality of spatial relations.

27. The method of claim 26, wherein receiving the plurality of spatial relations comprises receiving a Radio Resource Control, RRC, configuration of the plurality of spatial relations.

28. The method of claim 23, wherein the MAC CE includes one or more of a resource identifier of the PUCCH resource, a first indicator identifying the first spatial relation, and a second indicator identifying the second spatial relation.

29. The method of claim 23, wherein the MAC CE includes one of more of a resource group identifier of the PUCCH resource, resource identifiers of the PUCCH resources belonging to the PUCCH group, a first indicator identifying the first spatial relation, and a second indicator identifying the second spatial relation.

30. The method of claim 28, wherein the first indicator identifying the first spatial relation and the second indicator identifying the second spatial relation are part of a bitmap.

31. The method of claim 28, wherein the first indicator identifying the first spatial relation and the second indicator identifying the second spatial relation are given by separate identification fields.

32. The method of claim 1, wherein the UCI is triggered by DCI scheduling a PDSCH for which a HARQ A/N is to be carried on the PUCCH resource.

33. The method of claim 1, wherein the wireless device operates in a New Radio, NR, communications network.

34. A method performed by a base station for receiving Uplink Control Information, UCI, the method comprising:
transmitting an activation command to activate a first spatial relation and a second spatial relation out of a plurality of spatial relations;
receiving the UCI according to the first spatial relation in a first set of symbols or slots; and
receiving the UCI according to the second spatial relation in a second set of symbols or slots;
wherein the UCI in the second set of symbols is a repetition of the UCI in the first set of symbols within a same slot.

35. A wireless device for transmitting Uplink Control Information, UCI, the wireless device comprising:
one or more processors; and
memory comprising instructions to cause the wireless device to:
receive an activation command to activate a first spatial relation and a second spatial relation out of a plurality of spatial relations;
transmit the UCI according to the first spatial relation in a first set of symbols or slots; and
transmit the UCI according to the second spatial relation in a second set of symbols or slots;
wherein the UCI in the second set of symbols is a repetition of the UCI in the first set of symbols within a same slot.

36. A base station for receiving Uplink Control Information, UCI, the base station comprising:
one or more processors; and
memory comprising instructions to cause the base station to:
transmit an activation command to activate a first spatial relation and a second spatial relation out of a plurality of spatial relations;
receive the UCI according to the first spatial relation in a first set of symbols or slots; and
receive the UCI according to the second spatial relation in a second set of symbols or slots;
wherein the UCI in the second set of symbols is a repetition of the UCI in the first set of symbols within a same slot.

* * * * *